(12) United States Patent
Mishra

(10) Patent No.: US 12,141,541 B1
(45) Date of Patent: Nov. 12, 2024

(54) VIDEO TO NARRATION

(71) Applicant: Armada Systems, Inc., San Francisco, CA (US)

(72) Inventor: Pragyana K. Mishra, Seattle, WA (US)

(73) Assignee: Armada Systems, Inc., San Francisco, CA (US)

( * ) Notice: Subject to any disclaimer, the term of this patent is extended or adjusted under 35 U.S.C. 154(b) by 0 days.

(21) Appl. No.: 18/482,823

(22) Filed: Oct. 6, 2023

(51) Int. Cl.
*G06F 40/40* (2020.01)
*G06V 10/774* (2022.01)
*G06V 20/40* (2022.01)
*G06V 20/70* (2022.01)

(52) U.S. Cl.
CPC ............ *G06F 40/40* (2020.01); *G06V 10/774* (2022.01); *G06V 20/46* (2022.01); *G06V 20/49* (2022.01); *G06V 20/70* (2022.01)

(58) Field of Classification Search
CPC ...... G06F 40/40; G06V 10/774; G06V 20/46; G06V 20/49; G06V 20/70
See application file for complete search history.

(56) References Cited

U.S. PATENT DOCUMENTS

| | | | |
|---|---|---|---|
| 10,037,360 B2 | 7/2018 | Venkataraman et al. |
| 10,419,106 B1 | 9/2019 | Liu et al. |
| 10,438,094 B1 | 10/2019 | Ko et al. |
| 10,657,461 B2 | 5/2020 | McMahan et al. |
| 11,238,849 B1 | 2/2022 | Mimassi |
| 11,574,020 B1 | 2/2023 | Zhai et al. |
| 11,743,344 B1 | 8/2023 | Sivaswamy et al. |
| 11,907,289 B2 | 2/2024 | Checkley et al. |
| 2015/0120749 A1 | 4/2015 | Phanishayee et al. |
| 2017/0221072 A1 | 8/2017 | AthuluruTlrumala et al. |
| 2017/0249339 A1 | 8/2017 | Lester |
| 2017/0364539 A1 | 12/2017 | Jacob et al. |
| 2018/0032915 A1 | 2/2018 | Nagaraju et al. |
| 2018/0341720 A1 | 11/2018 | Bhatia et al. |

(Continued)

FOREIGN PATENT DOCUMENTS

| | | |
|---|---|---|
| EP | 0611500 B1 | 7/1999 |
| WO | 2019112667 A1 | 6/2019 |

OTHER PUBLICATIONS

Kulkarni et al., "BabyTalk: Understanding and Generating Simple Image Descriptions", IEEE Transactions on Pattern Analysis and Machine Intelligence, vol. 35, No. 12, Dec. 2013 (Year: 2013).*

(Continued)

*Primary Examiner* — Qian Yang
(74) *Attorney, Agent, or Firm* — Athorus, PLLC

(57) ABSTRACT

Disclosed are systems and methods that convert digital video data, such as two-dimensional digital video data, into a natural language text description describing the subject matter represented in the video. For example, the disclosed implementations may process video data in real-time, near real-time, or after the video data is created and generate a text-based video narrative describing the subject matter of the video. In addition, the disclosed implementations may also support a question and answer session in which a user may submit queries about the subject matter of one or more videos and the disclosed implementations will present natural language responses based on the subject matter of the video and any corresponding context.

20 Claims, 18 Drawing Sheets

(56) References Cited

U.S. PATENT DOCUMENTS

| | | | |
|---|---|---|---|
| 2019/0087960 A1* | 3/2019 | Jang | G06T 7/136 |
| 2019/0156246 A1 | 5/2019 | Kuo et al. | |
| 2019/0163766 A1 | 5/2019 | Gulati et al. | |
| 2019/0210742 A1 | 7/2019 | Satak et al. | |
| 2019/0332946 A1 | 10/2019 | Han et al. | |
| 2019/0370686 A1 | 12/2019 | Pezzillo et al. | |
| 2020/0027033 A1 | 1/2020 | Garg et al. | |
| 2020/0065395 A1 | 2/2020 | Pereira et al. | |
| 2020/0065966 A1 | 2/2020 | Spencer et al. | |
| 2020/0136994 A1 | 4/2020 | Doshi et al. | |
| 2020/0160207 A1 | 5/2020 | Song et al. | |
| 2020/0184012 A1 | 6/2020 | Stoyanovsky et al. | |
| 2020/0198739 A1 | 6/2020 | Sheldon-Coulson et al. | |
| 2020/0267053 A1 | 8/2020 | Zheng et al. | |
| 2020/0374974 A1 | 11/2020 | Sun et al. | |
| 2020/0379805 A1 | 12/2020 | Porter et al. | |
| 2020/0401891 A1 | 12/2020 | Xu et al. | |
| 2021/0034677 A1 | 2/2021 | Lee et al. | |
| 2021/0109966 A1 | 4/2021 | Ayush et al. | |
| 2021/0193187 A1 | 6/2021 | Phillips et al. | |
| 2021/0382923 A1 | 12/2021 | Gragnani et al. | |
| 2021/0406306 A1* | 12/2021 | Ambwani | G06F 16/951 |
| 2022/0019422 A1 | 1/2022 | Anderson | |
| 2022/0035878 A1 | 2/2022 | Sarah et al. | |
| 2022/0060455 A1 | 2/2022 | Rosenstein et al. | |
| 2022/0138489 A1* | 5/2022 | Ye | G06F 16/783 |
| | | | 382/159 |
| 2022/0150125 A1 | 5/2022 | Kumar et al. | |
| 2022/0292123 A1 | 9/2022 | Hoppe | |
| 2022/0345518 A1 | 10/2022 | Sgobba et al. | |
| 2022/0405484 A1 | 12/2022 | Kanchibhotla et al. | |
| 2023/0021216 A1 | 1/2023 | Shilawat et al. | |
| 2023/0244934 A1 | 8/2023 | Lazaridou et al. | |
| 2023/0267126 A1 | 8/2023 | Frieder et al. | |
| 2023/0267267 A1 | 8/2023 | Sukla | |
| 2023/0300195 A1 | 9/2023 | Sharma et al. | |
| 2023/0315766 A1 | 10/2023 | Cho et al. | |
| 2023/0401389 A1 | 12/2023 | Shmuel et al. | |

OTHER PUBLICATIONS

Gupta et al., "Using Closed Captions to Train Activity Recognizers that Improve Video Retrieval", 2009 IEEE Computer Society Conference on Computer Vision and pattern recognition) (Year: 2009).*

Ming et al. "Visuals to Text: A Comprehensive Review on Automatic Image Captioning", IEEE/CAA Journal of Automatica Sinica, vol. 9, No. 8, Aug. 2022 (Year: 2022).*

Hodosh et al., "Framing Image Description as a Ranking Task: Data, Models and Evaluation Metrics", .Journal of Artificial Intelligence Research 17 (2013) 853-899 (Year: 2013).*

Brown, Tom B., et al. "Language models are few-shot learners." Advances in Neural Information Processing Systems 33 (2020): 1877-1901.

Devlin, J. et al., 2018, BERT: Pre-training of Deep Bidirectional Transformers for Language Understanding. CoRR abs/1810.04805 (2018), arXiv:1810.04805, Retrieved: https://arxiv.org/pdf/1810.04805v1.pdf, 14 pages.

Dinh, T., et al. 2022. LIFT: Language-interfaced fine-tuning for non-language machine learning tasks. Advances in Neural Information Processing Systems 35 (2022), 11763-11784. URL: https://proceedings.neurips.cc/paper_files/paper/2022/file/4ce7fe1d2730f53cb3857032952cd1b8-Paper-Conference.pdf.

Goodfellow, Ian, Jean Pouget-Abadie, Mehdi Mirza, Bing Xu, David Warde-Farley, Sherjil Ozair, Aaron Courville, and Yoshua Bengio. "Generative adversarial nets." Advances in Neural Information Processing Systems 27 (2014). URL: https://proceedings.neurips.cc/paper_files/paper/2014/file/5ca3e9b122f61f8f06494c97b1afccf3-Paper.pdf.

Huang, L., et al. Armada: A Robust Latency-Sensitive Edge Cloud in Heterogeneous Edge-Dense Environments. arXiv:2111.12002 [cs.DC] Nov. 23, 2021. URL: https://arxiv.org/pdf/2111.12002.pdf, 13 pages.

Huang, Lei. "Armada: A robust latency-sensitive edge cloud in heterogeneous edge-dense environments." PhD diss., University of Minnesota, 2021, 55 pages.

Li, Xiang Lisa and Percy Liang. "Prefix-tuning: Optimizing continuous prompts for generation." arXiv preprint arXiv:2101.00190 (2021). URL: https://arxiv.org/pdf/2101.00190.pdf.

Luketina, Jelena, Nantas Nardelli, Gregory Farquhar, Jakob Foerster, Jacob Andreas, Edward Grefenstette, Shimon Whiteson, and Tim Rocktäschel. "A survey of reinforcement learning informed by natural language." arXiv preprint arXiv:1906.03926 (2019). URL: https://arxiv.org/pdf/1906.03926.pdf.

Mager, Manuel, Ramón Fernandez Astudillo, Tahira Naseem, Md Arafat Sultan, Young-Suk Lee, Radu Florian, and Salim Roukos. "GPT-too: A language-model-first approach for AMR-to-text generation." arXiv preprint arXiv:2005.09123 (2020). URL: https://arxiv.org/pdf/2005.09123.pdf.

Openai. [n. d.]. Introducing ChatGPT. www.openai.com, OpenAI, L.L.C. Accessed Oct. 17, 2023, URL: https://openai.com/blog/chatgpt/.

Openai. GPT-4 Technical Report. OpenAI. arXiv:2303.08774 (2023). URL: https://arxiv.org/pdf/2303.08774.pdf.

Radford, A. et al., 2018, Language Models are Unsupervised Multitask Learners, (2018) Retrieved: https://d4mucfpksywv.cloudfront.net/better-language-models/language_models_are_unsupervised_multitask_learners.pdf, 24 pages.

Ramos, Juan. "Using TF-IDF to determine word relevance in document queries." In Proceedings of the First Instructional Conference on Machine Learning, vol. 242., No. 1, 2003. URL: https://citeseerx.ist.psu.edu/document?repid=rep1&type=pdf&doi=b3bf6373ff41a115197cb5b30e57830c16130c2c.

Sharma, Mandar, Ajay Gogineni and Naren Ramakrishnan. "Innovations in neural data-to-text generation: A Survey." arXiv preprint arXiv:2207.12571 (2022). URL: https://arxiv.org/pdf/2207.12571.pdf.

Song, Kaitao, et al. "MPNet: Masked and Permuted Pre-training for Language Understanding." 34th Conference on Neural Information Processing Systems (NeurIPS 2020), Vancouver, Canada. URL: https://arxiv.org/pdf/2004.09297.pdf.

Sutton, R. S. and Barto, A. G., EM Reinforcement Learning: An Introduction. MIT press, 2018.

Touvron, Hugo, Louis Martin, Kevin Stone, Peter Albert, Amjad Almahairi, Yasmine Babaei, Nikolay Bashlykov, Soumya Batra, Prajjwal Bhargava, Shruti Bhosale, et al. "LLaMA 2: Open foundation and fine-tuned chat models." arXiv preprint arXiv:2307.09288 (2023). URL: https://arxiv.org/pdf/2307.09288.pdfÂ%C2%A0.

Touvron, Hugo, Thibaut Lavril, Gautier Izacard, Xavier Martinet, Marie-Anne Lachaux, Timothée Lacroix, Baptiste Rozière, Naman Goyal, Eric Hambro, Faisal Azhar, et al. "LLaMA: Open and efficient foundation language models." arXiv preprint arXiv:2302.13971 (2023). URL: https://arxiv.org/pdf/2302.13971.pdf.

Wang, Yizhong, Yeganeh Kordi, Swaroop Mishra, Alisa Liu, Noah A. Smith, Daniel Khashabi, and Hannaneh Hajishirzi. "Self-Instruct: Aligning language models with self-generated instructions." arXiv preprint arXiv:2212.10560 (2022). URL: https://arxiv.org/pdf/2212.10560.pdf.

Hsu, Tz-Heng, Zhi-Hao Wang, and Aaron Raymond See, "A cloud-edge-smart IoT architecture for speeding up the deployment of neural network models with transfer learning techniques." Electronics 11.14: 2255. (Year: 2002).

Wang, Hao, et al.; "Optimizing federated learning on non-iid data with reinforcement learning." IEEE Infocom 2020—IEEE Conference in Computer Communications. IEEE (Year: 2020).

Wang, Nan, et al., "ENORM: A framework for edge node resource management." IEEE transactions on services computing 13.6: 1086-1099. (Year: 2017).

* cited by examiner

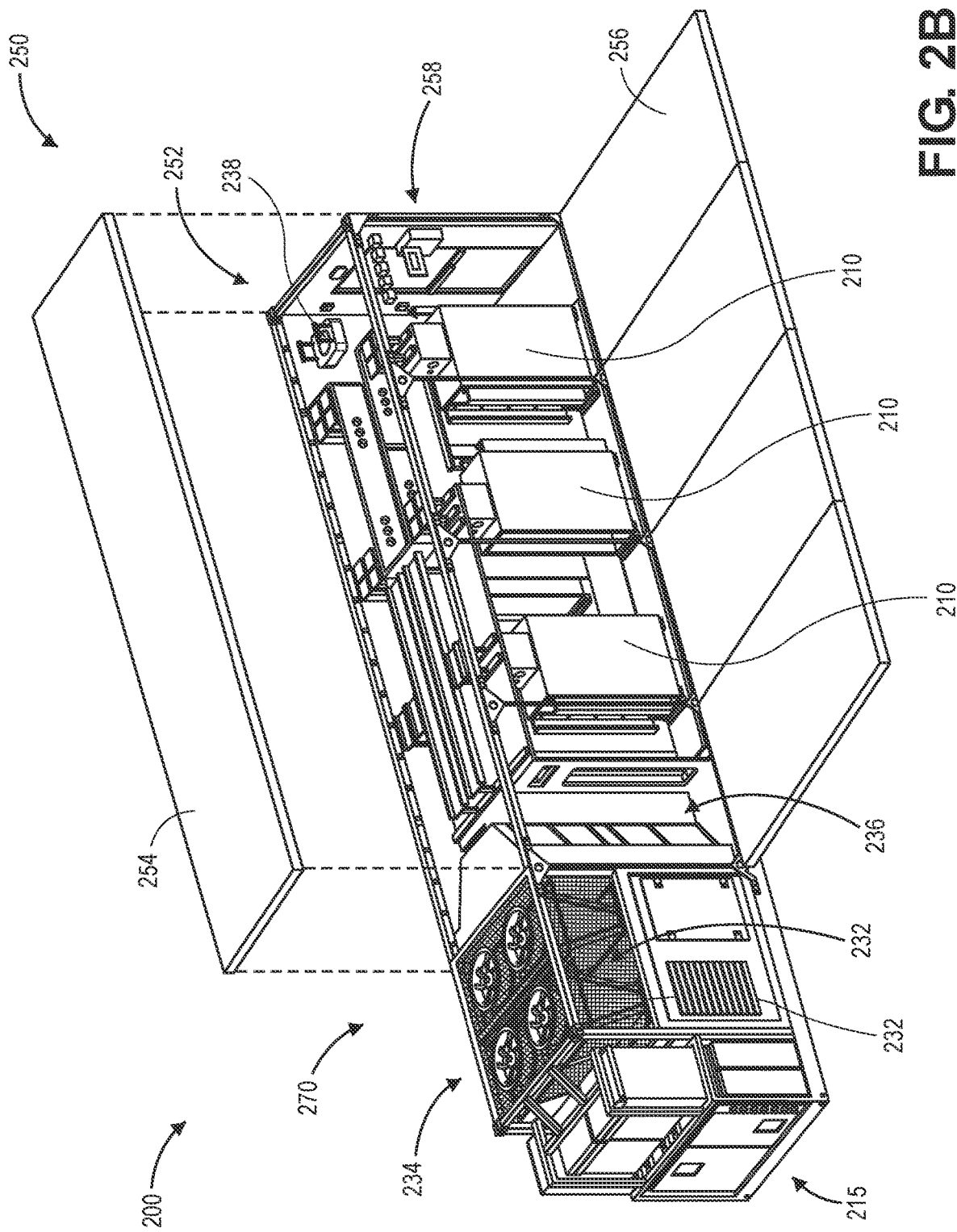

VIDEO TO NARRATION

BACKGROUND

In many existing cloud computing architectures, data generated at endpoints (e.g., mobile devices, Internet of Things ("IoT") sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence ("AI") and machine learning ("ML") workloads. For instance, centralized processing models and conventional cloud computing architectures can face constraints in the areas of latency, availability, bandwidth usage, data privacy, network security, and the capacity to process large volumes of data in a timely manner.

For instance, sensor data generated in remote operating environments often cannot be transmitted over conventional fiber optic or other physical/wired internet communication links, based in large part on the lack of such infrastructure in or near the remote operating environment. Consequently, sensor data generated in remote operating environments traditionally must be transmitted over much slower (and often more expensive) wireless communication links, such as cellular and/or satellite communication links.

A satellite communication link with a 25 Megabytes-per-second ("Mbps") upload speed will take approximately 90 hours (approximately four straight days) to transmit 1 terabyte ("TB") of data. However, many remote systems, also referred to herein as edge locations, include cameras and/or sensors that can easily generate in excess of 10 TB of raw data each day. Not only is transmission of the data a problem, storage at the edge location of such large amounts of data is also problematic.

BRIEF DESCRIPTION OF THE DRAWINGS

FIGS. 2A and 2B are example illustrations of an edge computing apparatus, in accordance with disclosed implementations.

DETAILED DESCRIPTION

Figure 1:
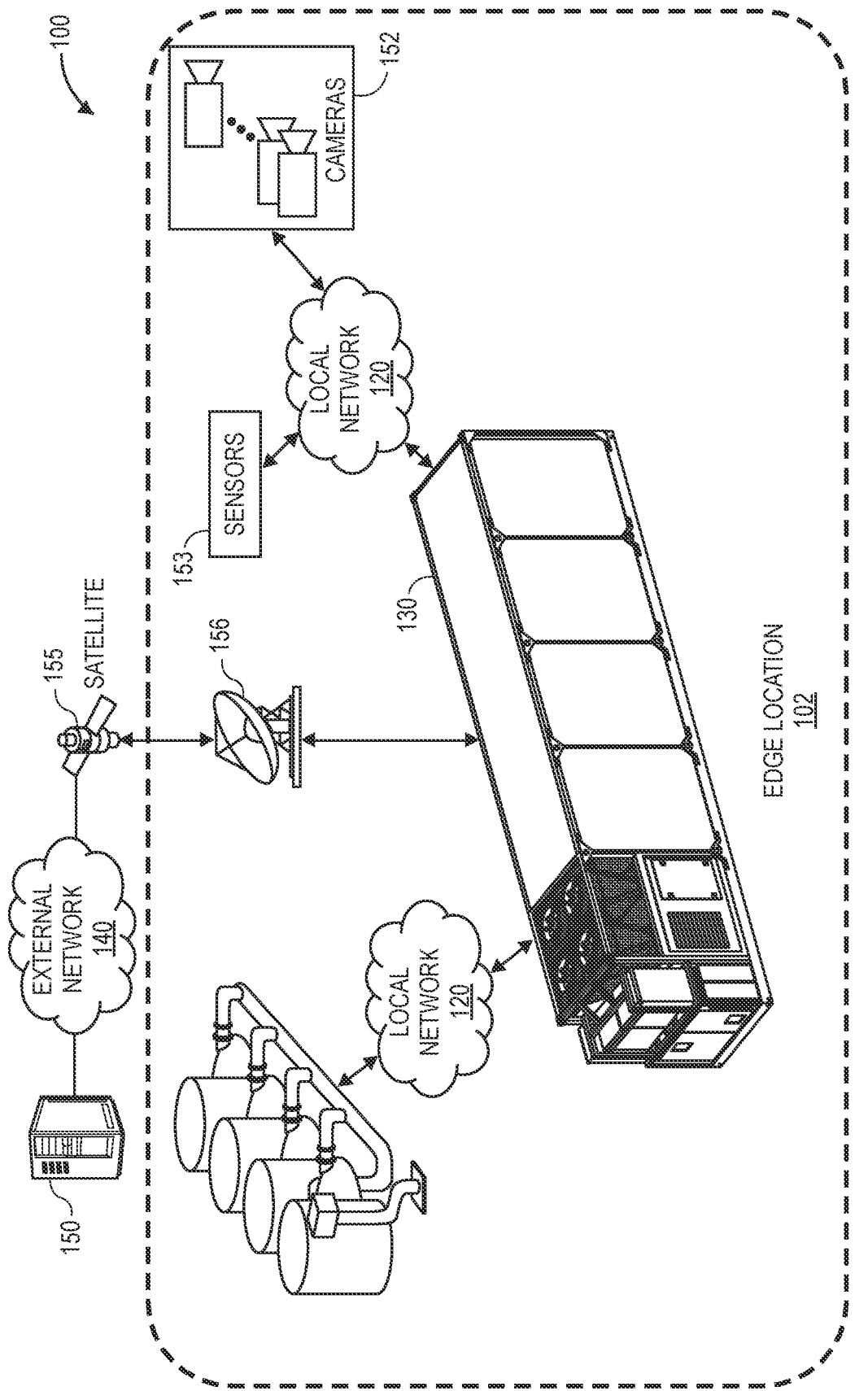
FIG. 1 is an illustration of an edge location with different sensors and cameras and an edge computing apparatus, in accordance with implementations of the present disclosure.

The systems and methods of the present disclosure are directed to converting digital video data, such as two-dimensional digital video data, into a natural language text description describing the subject matter represented in the video. As discussed further below, a video may be segmented into a plurality of overlapping video segments. Each of those video segments may be further processed to generate local embedding vectors corresponding to objects detected in the video segment, global embedding vectors corresponding to larger, collective information about the subject matter of the video segment, temporal embedding vectors representative of features of the segment over the time duration of the segment, and activity embedding vectors representative of activities detected in the subject matter of the video segment. Each of the different embeddings (local, global, temporal, activity) for a video segment may then be aggregated into a feature embedding representative of the video segment. The feature embedding may then be further processed to convert the collective of embeddings included in the feature embedding into a descriptive text that is descriptive of the video segment. One or more different descriptive texts of the overlapping video segments may then be processed to generate a natural language narrative describing the subject matter of the video, referred to herein generally as "text-based video narrative" or "text-based video narration." Such text-based video narration may be performed in real-time, near real-time, or at any time after creation of the video. In some implementations, based on the text-based video narrative, some or all of the video segments may be deleted as not needed or duplicative of other segments of the video, thereby reducing the storage capacity required to store the data and/or reducing the amount of video data to be transmitted.

In still further examples, the disclosed implementations may also provide a question and answer session ("Q&A session") during which an operator may present questions relating to the subject matter of one or more videos and receive natural language responses that answer the questions based on the subject matter of the video. For example, as discussed herein, feature embeddings of segments of a video and/or text-based video narratives of the video may be generated and stored for a video. An operator may submit a question and the disclosed implementations may process the feature embeddings for segments of the video and/or process the text-based video narrative of the subject matter of the video to determine a response to the question. The response may then be converted into a natural language and provided as a natural language output that is responsive to the question.

In some implementations, the systems and methods discussed herein rely on trained machine learning models operating on edge computing units that are in the form of ruggedized, autonomous systems that may be deployed to harsh environments with limited or unreliable power or network connectivity. The machine learning models may be trained using domain-specific information or data, which may be structured or unstructured in nature, and may be configured to generate reliable text-based video narratives and/or to provide responses to queries about a video, each of which may be generated at a local site or in an edge location with minimal latency. Video data and/or other sensor data may be received from cameras and/or other sensors, at the edge location, such as microphones, meters, gauges, etc., and processed at the edge location in accordance with the disclosed implementations.

Referring to FIG. 1, illustrated is a view of an edge location with different sensors and cameras and an edge computing apparatus, in accordance with disclosed implementations.

As is shown in FIG. 1A, a system 100 includes an edge location 102 and an edge computing unit 130 provided in association with the edge location 102. The edge computing unit 130 may be in communication with any number of devices or systems at the local site 102 over a local network 120, and also with any number of devices or systems, e.g., an external processing system 150, over an external network 140 that may include the Internet in whole or in part. In particular, as is shown in FIG. 1, the edge computing unit 130 may access the external network 140 or the external processing system 150 by way of one or more satellite dishes 156 at the edge location 102 with one or more satellites 155, which may provide a backhaul connection with the external network 140.

The edge location 102 shown in FIG. 1 may be any type of location at which remote computing is necessary or desirable. For example, and not by way of limitations, the edge location may be a desalination plant, e.g., a facility at which salt or other minerals are removed from water, an oil refinery, a stadium, a warehouse, a geological excavation site, a military outpost, etc. Alternatively, or additionally, the edge location 102 may be any other facility or location at which humans may engage in one or more operations, such as an agricultural site (e.g., a farm), an industrial site (e.g., a plant or factory), a tourist attraction (e.g., a remote hotel or park), or any other site. In some implementations, the edge location 102 may be a location where power or network connectivity from traditional power grids or other sources, e.g., alternating current ("AC") power in any number of phases and at any frequency or voltage, or direct current ("DC") power at any voltage, are limited or unavailable at one or more times during any given day. Moreover, in some implementations, the local site 102 may include any number of assets, such as systems or components for capturing or sensing information or data, e.g., cameras or other sensors, as well as vehicles of any type or form, which may be manned or unmanned.

The edge computing unit 130 may be a computer system that includes any number of servers, processors, data stores, transceivers, switches, or other computer components or systems, as well as any number of power units, environmental control systems, isolation systems, or systems. Power units of the edge computing unit 130 may include any number of batteries, diesel engines, solar panels, or other power sources. Environmental control systems of the edge computing unit 130 may include any number of heating units, air conditioning units, fans, dampers, valves, humidifiers, dehumidifiers, or other systems for controlling environmental conditions within or around the edge computing unit 130. Isolation systems of the edge computing unit 130 may include any number of components for isolating internal portions of the edge computing unit 130 from an external environment at the local site 102, and may form or define chambers having any number of covers, sides, bottoms, doors, or other components formed from any suitable materials. Alternatively, or additionally, the edge computing unit 130 may include any number of other components or systems.

Components of the edge computing unit 130 may be provided in a housing, such as a containerized unit, that is configured to maintain such components at desired temperatures, pressures, humidity levels or others, while protecting such components against the elements or any other adverse conditions at the local site 102. The edge computing unit 130 may have been transported to the local site 102 by one or more external propulsion units, e.g., aircraft, road tractors, ships, trailers or trains, or others, and may include one or more motors or other systems for reorienting or repositioning itself at the local site 102.

The local network 120 may include any number of networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols. For example, in some implementations, the local network 120 may include any number of access points, switches, routers or other components that may be configured to enable the exchange of information or data between one or more sensors, devices or other assets provided at the local site 102 and the edge computing unit 130 over any number of systems or protocols.

The external network 140 may be any wired network, wireless network, or combination thereof, and may comprise the Internet in whole or in part. In addition, the external network 140 may be a personal area network, local area network, wide area network, cable network, satellite network, cellular telephone network, or combination thereof. The external network 140 may also be a publicly accessible network of linked networks, possibly operated by various distinct parties, such as the Internet. In some embodiments, the external network 140 may be a private or semi-private network, such as a corporate or university intranet. The external network 140 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and need not be described in more detail herein.

Any combination of networks or communications protocols may be utilized by the local network 120 or the external network 140 in accordance with the systems and methods of the present disclosure. For example, devices or systems connected to the local network 120 or the external network 140 described herein may be configured to communicate via an open or standard protocol such as Wi-Fi. Alternatively, devices or systems connected to the local network 120 or the external network 140 may be configured to communicate with one another directly outside of a centralized network, e.g., by a wireless protocol such as Bluetooth®, in which two or more of such components may be paired with one another.

The external processing system 150 may include any number of physical computer servers having one or more computer processors and any number of data stores (e.g., databases) associated therewith, as well as being provided for any specific or general purpose. For example, the external processing system 150 may be independently provided for the exclusive purpose of receiving, analyzing or storing information or data received from the edge computing unit 130 or, alternatively, provided in connection with one or more physical or virtual services that are configured to receive, analyze or store such information or data, as well as to perform one or more other functions. In some implementations, the external processing system 150 may be provided in a physical location. In other such implementations, the external processing system 150 may be provided in one or more alternate or virtual locations, e.g., in a "cloud"-based environment.

The satellite 155 may be any system that is configured to relay signals containing information or data between two or more computer devices or systems while orbiting the Earth. For example, the satellite 155 may be a portion of a propagation path of a communication link between two or more computer devices or systems that orbits the Earth. Alternatively, or additionally, the satellite 155 may be any other airborne or spaceborne device or system, e.g., an airliner, a drone, or a balloon, that may but need not travel in outer space or orbit the Earth to relay signals between the edge computing unit 130 and the external network 140 or the external processing system 150.

Although only a single satellite 155 is shown in FIG. 1, the edge computing unit 130 may be configured to communicate with the external network 140, or any external processing systems 150, by way of any number of satellites 155. Moreover, in some implementations, the edge computing unit 130 may be configured to communicate with the external network 140 by the transmission or receipt of data by any other means or techniques other than the satellite 155.

As discussed herein, video data generated by the one or more cameras 152 of the edge location 102 may be processed to generate a text-based video narrative that describes the subject matter of the video. Likewise, in some implementations sensor data generated by the one or more sensors 153 of the edge location 102 may also be processed to generate a text-based sensor narrative that describes the sensor data collected by the one or more sensors. In some implementations, the text-based video narratives and/or the text-based sensor narratives may be stored to supplement or replace (in whole or in part) the video data and/or the sensor data, which may drastically reduce the storage capacity needed at the edge location 102. Still further, in some implementations, the text-based video narratives and/or the text-based sensor narratives may be transmitted to the external processing system 150, thereby reducing the transmission requirements needed to convey/transmit the subject matter represented by the video data and/or sensor data.

In still further implementations, the text-based video narratives and/or text-based sensor narratives may be utilized to generate responses to operator provided questions about the subject matter of a video, as part of a Q&A session.

Accordingly, the systems and methods of the present disclosure may be used to provide conversational tools to provide text-based video narratives of video and/or to address queries of humans regarding the subject matter of a video generated at local sites or edge locations. The conversational tools of the present disclosure may be operated or executed by edge computing units (or edge computing apparatuses) operating at such sites or in such locations, and may rely on comprehensive, domain-specific knowledge bases to generate the text-based video narratives, text-based sensor narratives, to generate responses to queries received from humans, etc.

While the following examples focus primarily on the generation of text-based video narratives and providing a Q&A session with respect to one or more videos, it will be appreciated that the disclosed implementations are equally applicable and include data from other types of sensors beyond just video data received from one or more cameras. For example, the disclosed implementations may also be utilized to generate text-based sensor narratives and/or Q&A sessions based on data received from other sensors at an edge location, such as a pressure sensors, vibration sensors, motion sensors, light sensors, temperature sensors, etc. Likewise, in some implementations, rather than considering data from multiple video sources as part of a Q&A session, report generation etc., in some implementations, data from multiple different types of sensors may be collectively considered and utilized in generating natural language responses to questions, generating reports, monitoring and reporting on alerts, etc.

Edge computing units 130 of the present disclosure may have any size or shape, and take any form. In some implementations, edge computing units 130 may be provided in standardized containers, thereby enabling such units to be rapidly transported to any location by a single mode or in an intermodal fashion, e.g., by air, sea or land, and positioned in place using standard equipment such as cranes, forklifts, or other machinery. The edge computing units 130 may contain or have ready access to critical infrastructure such as power, climate control systems, security features, fire protection systems or access control systems. The edge computing units 130 may also include integrated hardware components and software applications programmed thereon prior to deployment, such that the edge computing units may be activated and placed into service following installation without delay.

Edge computing units 130 of the present disclosure may further include sufficient power for sustaining operations of such units, and ensuring redundancy even during downtime such as maintenance, updating or repairs. The edge computing units 130 may operate based on alternating current ("AC") electrical power, direct current ("DC") electrical power, or power from any other source. In some implementations, the edge computing units may operate on 480 volt, three-phase, 60 Hertz AC power. In some other implementations, the edge computing units 130 may be configured for operation on 220 to 230 volt, single-phase AC power at any frequency. Alternatively, the edge computing units may operate using AC power or DC power at any voltage, power level or frequency.

Edge computing units 130 of the present disclosure may also include any number of servers or other computer devices or systems, as may be required in order to execute any desired applications or perform any desired functions. In some implementations, the edge computing units 130 may include server racks that are isolated or otherwise configured for resistance against shocks or vibrations during transportation and/or operations.

Edge computing units 130 may be operated independently or as members of groups (e.g., a fleet of such units), and may communicate over local networks 120 at local sites where the edge computing units are employed, e.g., via short-range wired or wireless networks, or over backhaul links to the Internet or other computer networks via wired, wireless or satellite connections. The edge computing units 130 may be programmed with software applications for overseeing operations at a local site, as well as power, data transmission and connectivity of the edge computing units, for simplifying the deployment and management of applications with asset-aware resource provisioning, for managing workloads deployed to edge computing units or other assets at local sites with automatic resource provisioning, job assignment or cancellation features, and for maintaining security and access controls for the edge computing units and other assets.

Figure 2A:
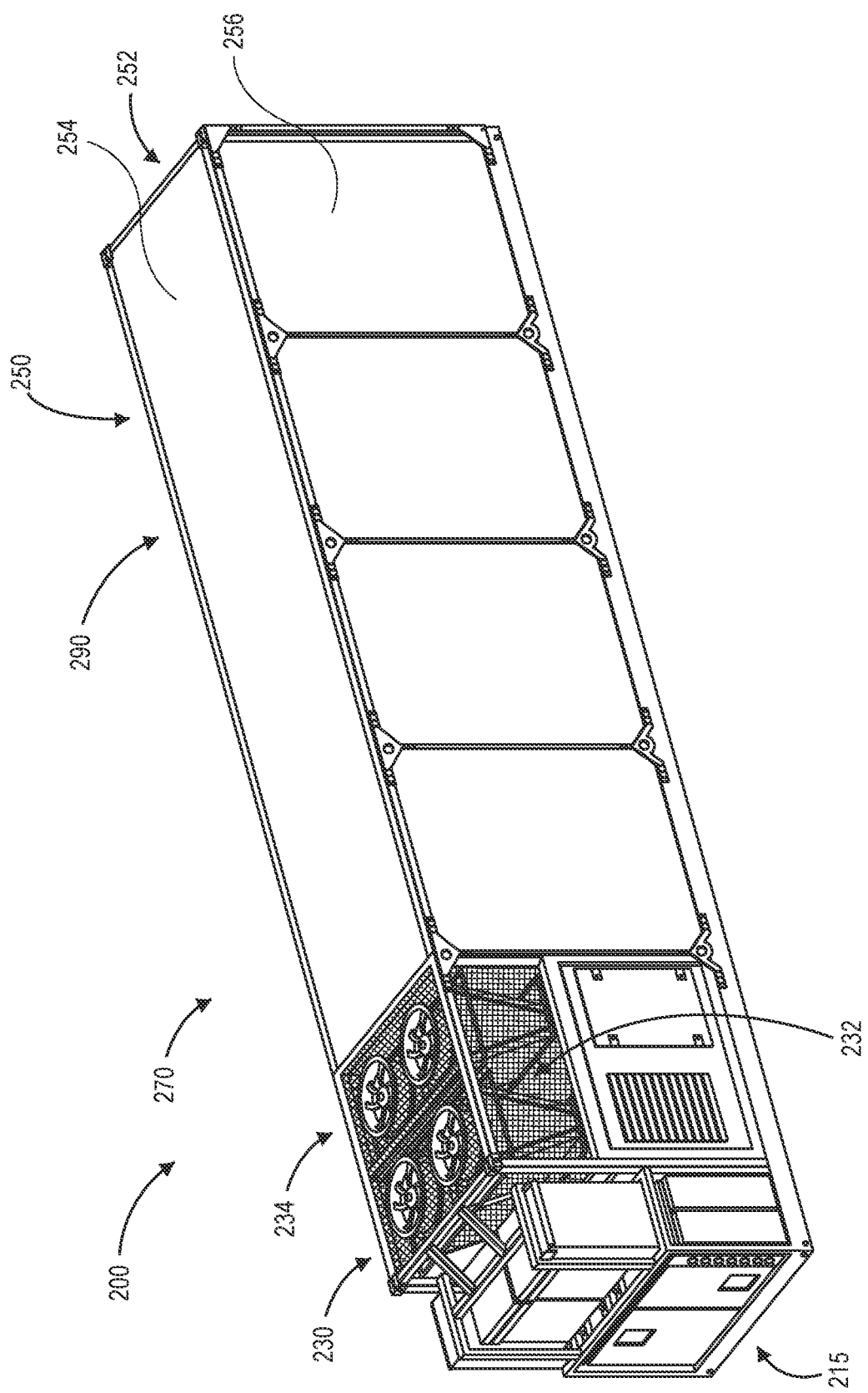

Edge computing units 130 of the present disclosure may have any size, shape or dimensions, and may include any number of components or systems. Referring to FIGS. 2A and 2B, an edge computing apparatus 200 of the present disclosure is shown. As is shown in FIGS. 2A and 2B, the edge computing apparatus 200 comprises a plurality of server racks 210, a plurality of power units 215, a plurality of environmental control systems 230 and an isolation system 250 disposed in a housing 270 having a form of a containerized unit 290. The edge computing apparatus 200 may be deployed to particular sites or locations, which may be referred to herein as "local sites" or "edge locations," using one or more external propulsion units such as aircraft, road tractors, ships, trailers, trains, or others, which may be configured to lift, carry or otherwise transport the edge computing apparatus 200 to such locations, e.g., over substantially long distances. Alternatively, the edge computing apparatus 200 may further include propulsion units that are integrated with the edge computing apparatus 200, such as motors, engines, drive train components, transmissions, axles, wheels or other features. For example, in some implementations, the edge computing apparatus 200 may be an integral component of a road tractor, a trailer or a train. In some implementations, the edge computing apparatus 200 may further include one or more internal propulsion systems, e.g., electrical motors, which may be used to subsequently move or relocate the edge computing apparatus 200 for short distances upon an arrival at a local site or an edge location.

The server racks 210 may include any number of computing components, units or systems. For example, in some implementations, each of the server racks may include one or more central processing units, as well as data stores or other memory components, networking systems, power supplies, high-performance computing units, e.g., graphical processing units, field programmable gate arrays, vision processing units, associative processing units, tensor processing units, neuromorphic chips, quantum processing units, or the like. Numbers of the respective processor units or other components within each of the server racks 210 may be selected for redundancy or for resiliency, or on any other basis. Moreover, the networking systems may include one or more routers, networking switches, out-of-band switches, or systems for communication between the respective server racks 210 or any number of components of the edge computing apparatus 200 within the housing 270, or for communication with any number of external systems (not shown).

The edge computing apparatus 200 may further include one or more power units 215, which may include any number of components for generating or storing energy in any form. For example, in some implementations, the power units 215 may include any number of batteries or other power cells, e.g., dry cell or wet cell batteries such as lead-acid batteries, lithium-ion batteries, nickel cadmium batteries or nickel metal hydride batteries, or any other type, size or form of batteries. In some implementations, the power units 215 may further include one or more diesel engines, electric engines, or engines or motors that are powered by any other source of energy, e.g., gasoline, natural gas, fuel cells, nuclear reactors, solar power, or others. The power units 215 of the edge computing apparatus 200 may be selected on any basis, such as their respective peak or mean voltages, peak or mean load currents, charge times, fuel capacities, or other attributes.

In some implementations, the power units 215 may be coupled to one or more solar panel arrays that are included in, coupled to, or otherwise associated with surfaces of the edge computing unit 200. For example, solar panel arrays may be attached to a top surface of the housing 270, or in any other portion of the housing 270. The solar panel arrays may be fixed in position, or foldable, collapsible, or otherwise movable between deployed and stowed positions, and exposed in order to generate electrical power using sunlight incident upon surfaces of the solar panel arrays. Electrical power generated by solar panel arrays may be transferred to the power units 215 and used to power the edge computing unit 200 and its constituent components.

The edge computing apparatus 200 may further include one or more environmental control systems 230 in order to maintain or establish a desired set of environmental conditions (e.g., temperature, pressure, humidity, or others) within the edge computing apparatus 200. For example, the environmental control systems 230 may include, but need not be limited to, one or more air conditioning units 232, fans 234, dampers 236 and heaters 238. The air conditioning units 232 may be formed from metals, plastics or other suitable materials and include any number of compressors, condensers, evaporators or other systems for maintaining or reducing air temperatures within the edge computing apparatus 200. The environmental control systems 230 may include any number of fans 234 for initiating air flows into the air conditioning units 232 or throughout the housing 270. The environmental control systems 230 may also include one or more dampers 236 for initiating, isolating or regulating flows of air into, throughout or out of the edge computing apparatus 200. The environmental control systems 230 may further include one or more heaters 238 of any type or form, e.g., electric, gas, kerosene, propane, or others, which may include any number of systems for maintaining or increasing air temperatures within the edge computing apparatus 200.

The environmental control systems 230 shown in FIGS. 2A and 2B are integral to the edge computing apparatus 200. Alternatively, or additionally, the edge computing system 200 may include any number of other environmental control systems (not shown) that operate in a standalone manner, external to the edge computing apparatus 200, in order to maintain or establish a desired set of environmental conditions within the edge computing apparatus 200.

As is shown in FIGS. 2A and 2B, the edge computing apparatus 200 may further include an isolation system 250 for isolating internal portions of the edge computing apparatus 200 from an external environment. The isolation system 250 may include a chamber 252 defined by a top cover 254, a plurality of sides 256 and a door 258.

The isolation system 250 may be configured to secure contents of the edge computing apparatus 200, e.g., the server racks 210 or others, and to protect such contents from the elements while also restricting unauthorized access or entry into the chamber 252. For example, the isolation system 250 may be closed and sealed to maintain the chamber 252 in any desired condition, e.g., at selected levels of temperature, pressure and humidity, and access to the chamber 252 may be provided by way of the door 258 following the operation of one or more access control systems, e.g., any remotely activated locking systems for such doors or other portals. Components of the isolation system 250 may have any quality, strength or security ratings. Furthermore, materials from which the cover 254, the sides 256 or the door 258 are formed or constructed may be selected to further provide radiofrequency shielding or to serve other protective functions for contents of the chamber 252.

Components of the isolation system 250 may also serve one or more other purposes, in addition to enclosing and securing portions of the edge computing apparatus 200 contents of the chamber 252 therein. For example, portions of the isolation system 250 may also provide structural support to the housing 270 or any other portions of the edge computing apparatus 200.

The housing 270 may have any size or shape, and may take any form. In some implementations, the housing 270 may be a shipping container, or a similar vessel, of any standard shape or length. For example, in some implementations, the housing 270 may be a 40-foot vented shipping container constructed from steel and having one or more steel frames and/or castings that are sufficiently durable and strong enough to accommodate cargo, and to withstand impacts due to stacking, shocks or other contact during normal operation. In other implementations, the housing 270 may be made from a non-steel material, which may be appropriate where the containerized units 290 are deployed across wide geographical areas and need not be stacked, enabling lighter and more cost-effective materials other than steel to be used to form the housing 270. Additionally, in some implementations, the housing 270 may take the form of an intermodal container having standard dimensions including widths of approximately eight to eight-and-one-half feet (8 to 8.5 ft) and lengths of twenty, forty, forty-five, forty-eight or fifty-three feet (20, 40, 45, 48 or 53 feet) and heights of approximately eight to ten feet (8 to 10 ft), typically eight-and-one-half or nine-and-one-half feet (8.5 or 9.5 ft).

Implementations of the present disclosure may be operated, performed or executed by any type or form of computing device, apparatus or system, and need not be limited to the edge computing apparatus 200 of FIGS. 2A and 2B. Such devices, apparatuses or systems may include, but need not be limited to, cameras, mobile devices (e.g., smartphones, tablet computers, or the like), desktop computers, laptop computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Figure 3A:
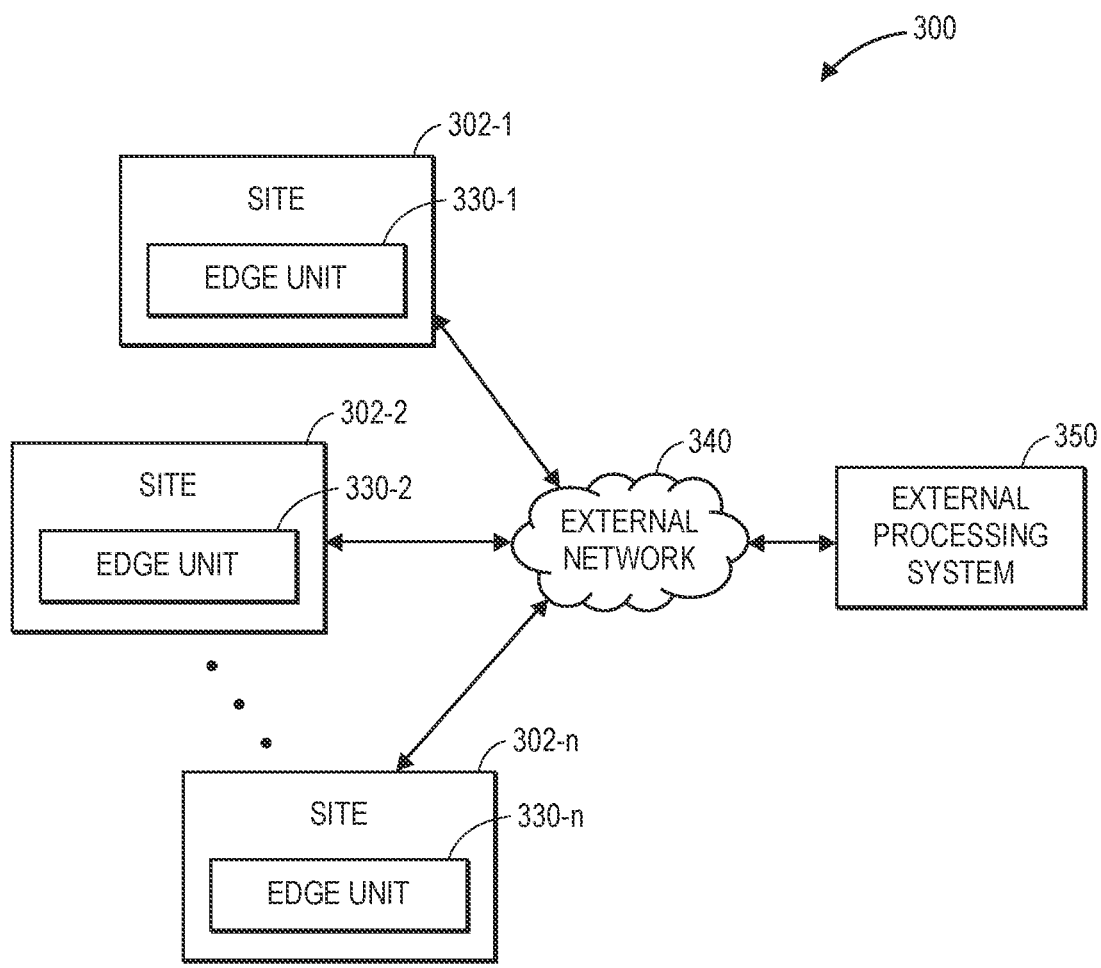
FIGS. 3A and 3B are block diagrams of an example system, in accordance with disclosed implementations.
Figure 3B:
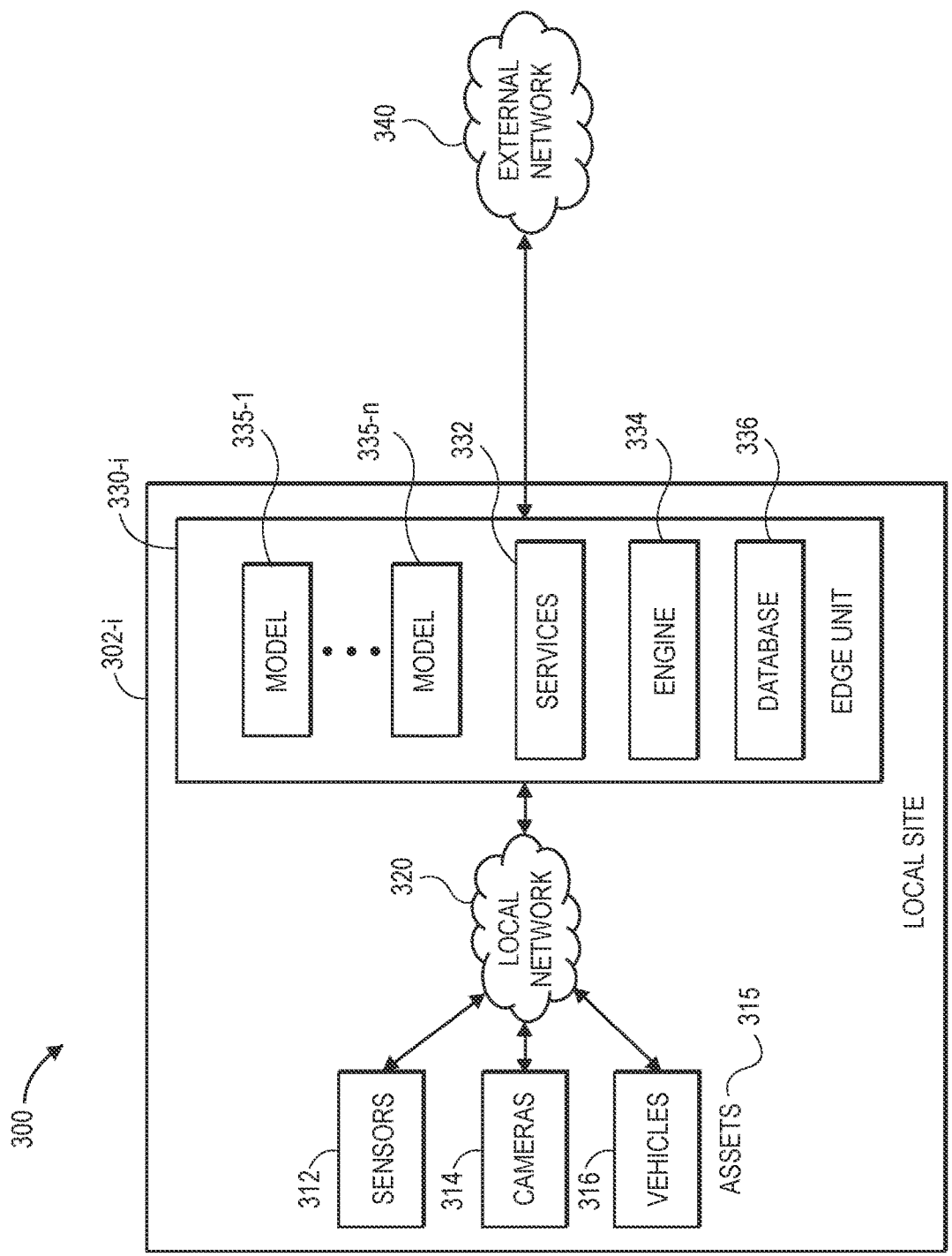

Edge computing apparatuses may be provided at any site or location and in any number, and may be connected to one another or any external systems over one or more external networks. Referring to FIGS. 3A and 3B, block diagrams of one system 300 in accordance with implementations of the present disclosure are shown.

As is shown in FIG. 3A, the edge computing system 300 includes a plurality of edge computing units (or systems) 330-1, 330-2 . . . 330-$n$ and an external processing system 350. The plurality of edge computing units 330-1, 330-2 . . . 330-$n$ are distributed at various local sites 302-1, 302-2 . . . 302-$n$, which may also be referred to herein as "edge locations," and connected to one another and the external processing system 350 over an external network 340, which may include the Internet in whole or in part. Each of the sites 302-1, 302-2 . . . 302-$n$ may include any number of edge computing units 330-1, 330-2 . . . 330-$n$.

As is shown in FIG. 3B, a representative of one of the sites 302-1, 302-2 . . . 302-$n$ including a representative one of the edge computing units 330-1, 330-2 . . . 330-$n$ is shown. The edge computing unit 330-$i$ may be used to implement or perform one or more aspects of the present disclosure. The edge computing unit 330-$i$ may also be referred to as an "edge device" or an "edge compute unit." In some implementations, the edge computing unit 330-$i$ may be provided as a high-performance compute and storage ("HPCS") and/or elastic-HPCS ("E-HPCS") edge device. As is further shown in FIG. 3B, the edge computing unit 330-$i$ may be in communication with any number of assets 315 at the site 302-$i$, including one or more sensors 312, one or more cameras 314, and one or more vehicles 316, or others, and may transmit information or data to such assets 315, or receive information or data from such assets 315, during operations of such assets 315 at the site 302-$i$, over one or more local networks 320. Such local networks 320 may include, but need not be limited to, one or more networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols.

The site 302-$i$ may be any one of a plurality of environments or deployment locations associated with the edge computing unit 330-$i$. The site 302-$i$ may be a geographic location or area associated with an enterprise user (or another user) of edge computing, or an edge location in a data network topography in terms of data network connectivity. Alternatively, or additionally, the site 302-$i$ may be both a geographic location of an enterprise user and an edge location in the data network topography.

The edge computing unit 330-*i* may be configured as a containerized edge compute unit or data center for implementing sensor data generation or ingestion and inference for one or more trained machine learning or artificial intelligence models provided thereon. For instance, the edge computing unit 330-*i* may include computational hardware components configured to perform inference for one or more trained machine learning or artificial intelligence models. As is shown in FIG. 3B, one portion of the edge computing unit 330-*i* may include hardware resources associated with or used to implement a first model 335-1, while another portion of the edge computing unit 330-*i* may include hardware resources associated with or used to implement an n-th model 335-*n*, where n may be any number of different machine learning or artificial intelligence models that may be operated simultaneously or in parallel. The model or models executing by the edge computing unit 330-*i* may also be referred to herein as an "edge model" or "edge models."

In some cases, the system 300 may utilize the edge computing systems 330-1, 330-2 . . . 330-*n* provided at one or more of the sites 302-1, 302-2 . . . 302-*n* to capture and process information or data received locally via the local networks 320, e.g., from any of the assets 315, and transmit the data to one or more external computing systems 350 over one or more external networks 340.

The local network 320 may provide any number of communication links between the edge computing system 330-*i* and respective ones of the assets 315. In some implementations, one or more aspects of the local network 320 may be implemented as a private or public "5G" network, "4G" network, "Long-Term Evolution" network, or other cellular network. Alternatively, or additionally, one or more aspects of the local network 320 may be implemented as a Wireless-Fidelity (or "Wi-Fi") network, a Bluetooth® network, a Zigbee network, a Z-wave network, a Long Range (or "LoRa") network, a Sigfox network, a Narrowband Internet of Things (or "NB-IoT" network, or any other short-range wireless network.

The edge computing unit 330-*i* may receive different types of information or data from any number of the assets 315, and may transmit any type of information or data received from such assets 315 to any number of external computing systems 350. For example, in some implementations, the edge computing unit 330-*i* may receive streams of information or data from any of the sensors 312, which may include but need not be limited to one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 312 may also include any number of memory or storage components and processors, photosensitive surfaces, filters, chips, electrodes, clocks, boards, timers or any other relevant features (not shown) for aiding in their operation.

In some implementations, the edge computing unit 330-*i* may also receive streams of information or data from any of the cameras 314, which may include imaging devices of any type or form, e.g., digital cameras, depth sensors or range cameras, infrared cameras, radiographic cameras or other optical sensors. The cameras 314 may be configured to photograph or otherwise capture visual information or data (e.g., still or moving images in color or black and white that may be captured at any frame rates, or depth imaging data such as ranges), or associated audio information or data, or metadata, regarding objects or activities occurring at the site 302-*i*, or for any other purpose.

For example, the cameras 314 may be configured to capture or detect reflected light if the reflected light is within fields of view of the cameras 314, which may be defined as a function of a distance between an imaging sensor and a lens within one of the cameras 314, viz., a focal length, as well as positions of the cameras 314 and angular orientations of their respective lenses. The cameras 314 may further include manual or automatic features for modifying a field of view or orientation. For example, one or more of the cameras 314 may be configured in a fixed position, or with a fixed focal length (e.g., fixed-focus lenses) or angular orientation. Alternatively, one or more of the cameras 314 may be configured with actuated or motorized features for adjusting a position, a focal length (e.g., zooming the imaging device) or an angular orientation (e.g., the roll angle, the pitch angle or the yaw angle), by causing a change in a distance between the imaging sensor and the lens (e.g., optical zoom lenses or digital zoom lenses), a change in a position of the cameras 314, or a change in one or more of the angles defining the angular orientation of the cameras 314.

In some implementations, one or more of the cameras 314 may be an imaging device that is hard-mounted to a support or mounting that maintains the cameras 314 in a fixed configuration or angle with respect to one, two or three axes. Alternatively, one or more of the cameras 314 may be provided with one or more motors and/or controllers for manually or automatically operating one or more of the components, or for reorienting the axis or direction of the cameras 314, i.e., by panning or tilting the cameras 314. Panning the cameras 314 may cause a rotation within a horizontal plane or about a vertical axis (e.g., a yaw), while tilting the cameras 314 may cause a rotation within a vertical plane or about a horizontal axis (e.g., a pitch). Additionally, one or more of the cameras 314 may be rolled, or rotated about its axis of rotation, and within a plane that is perpendicular to the axis of rotation and substantially parallel to a field of view of the cameras 314.

In some implementations, the edge computing unit 330-*i* may also receive streams of information or data from any of the vehicles 316, which may include, but need not be limited to, one or more autonomous ground vehicles, one or more autonomous aerial vehicles (e.g., drones), or any other vehicle of any type, such as cars, trucks, trailers, freight cars, container ships or aircraft, which may be manned or unmanned (e.g., drones). Such vehicles 316 may be outfitted with any number of the sensors 312 or the cameras 314 described herein.

The vehicles 316 may receive information or data of any type or form from the edge computing unit 330-*i*, and transmit information or data of any type or form to the edge computing unit 330-*i*. The vehicles 316 may also receive information or data of any type or form from the edge computing unit 330-*i*, and transmit information or data of any type or form to the assets 315, e.g., the sensors 312 or the cameras 314. For example, in some implementations, the edge computing unit 330-*i* may provide information or data regarding any number of configurations or controls to the assets 315. In some other implementations, the edge computing unit 330-*i* may receive onboard camera feed and other sensor information, e.g., 3D range scanner, LiDAR, or odometry information for Simultaneous Localization and Mapping (or "SLAM"), from the vehicles 316, and may transmit any number of instructions to the vehicles 316.

Additionally, in some implementations, the edge computing unit 330-*i* may be further utilized to execute one or more sets of instructions for locally storing information or data, executing one or more of the models 335-1 . . . 335-*n*. e.g., for inference, predictions or responses, or performing any other tasks or functions at the edge computing unit 330-*i*, with limited to no reliance on any external computing systems 350, e.g., in the "cloud." For example, the edge computing unit 330-*i* may also be used to perform inference or generate predictions locally, e.g., by executing one or more of the trained or pretrained machine learning or artificial intelligence models 335-1 . . . 335-*n* that may be received from any external computing systems 350 or any other edge computing units.

Results or predictions generated by the models 335-1 . . . 335-*n* may be compressed and periodically uploaded by the edge computing unit 330-*i* to external computing systems 350, e.g., in the "cloud," over the external network 340, which may include a satellite network configured to provide wireless satellite connectivity between the edge computing unit 330-*i* at the site 302-*i* and existing network infrastructure. Such results or predictions may be included in batch uploads transmitted over the external network 340, which may act as an Internet backhaul link, to any number of external computing systems 350. Additionally, in some implementations, results or predictions may be utilized immediately at the edge computing unit 330-*i*, and transmitted in compressed form to the external computing systems 350, e.g., in the "cloud," at a later time. For example, the external network 340 may be used to provide periodic transmission or upload of compressed prediction or inference results, e.g., during high-bandwidth or low-cost availability hours associated with the external network 340.

In some implementations, results or predictions may be obtained by performing one or more essential functions or tasks using the models 335-1 . . . 335-*n*, while offloading more computationally intensive and/or less time-sensitive tasks from the edge computing unit 330-*i* to other machine learning or artificial models executed by one or more external computing systems 350, e.g., in the "cloud." For example, in some implementations, machine learning or artificial intelligence models operated by remote computing systems, e.g., the external computing systems 350, may be utilized to train or fine-tune one or more of the models 335-1 . . . 335-*n*, and updated versions of such models may be transmitted to the edge computing unit 330-*i* over the external networks 340, e.g., via a network backhaul. In some implementations, the models 335-1 . . . 335-*n* may be trained, fine-tuned, retrained or replaced in an iterative or continuous manner. For example, in some implementations, the edge computing unit 330-*i* may be configured to perform scheduled or periodic downloads or updates of the models 335-1 . . . 335-*n* based on information or data received from the external computing systems 350. Downloads or updates of the models 335-1 . . . 335-*n* may be distributed to the edge computing unit 330-*i* in a "push" fashion, whereby the external computing systems 350 transmit updated or models to edge computing unit 330-*i* over the external networks 340, e.g., via a network backhaul, as updated or new models become available.

The edge computing unit 330-*i* may further include any number of services 332 for executing or operating with any external computing systems 350, e.g., in the "cloud," as well as an engine 334 (e.g., a high-performance compute engine) for implementing or managing the models 335-1 . . . 335-*n*, and one or more databases (e.g., data stores) 336 for maintaining information or data of any type or form thereon.

Figure 4:
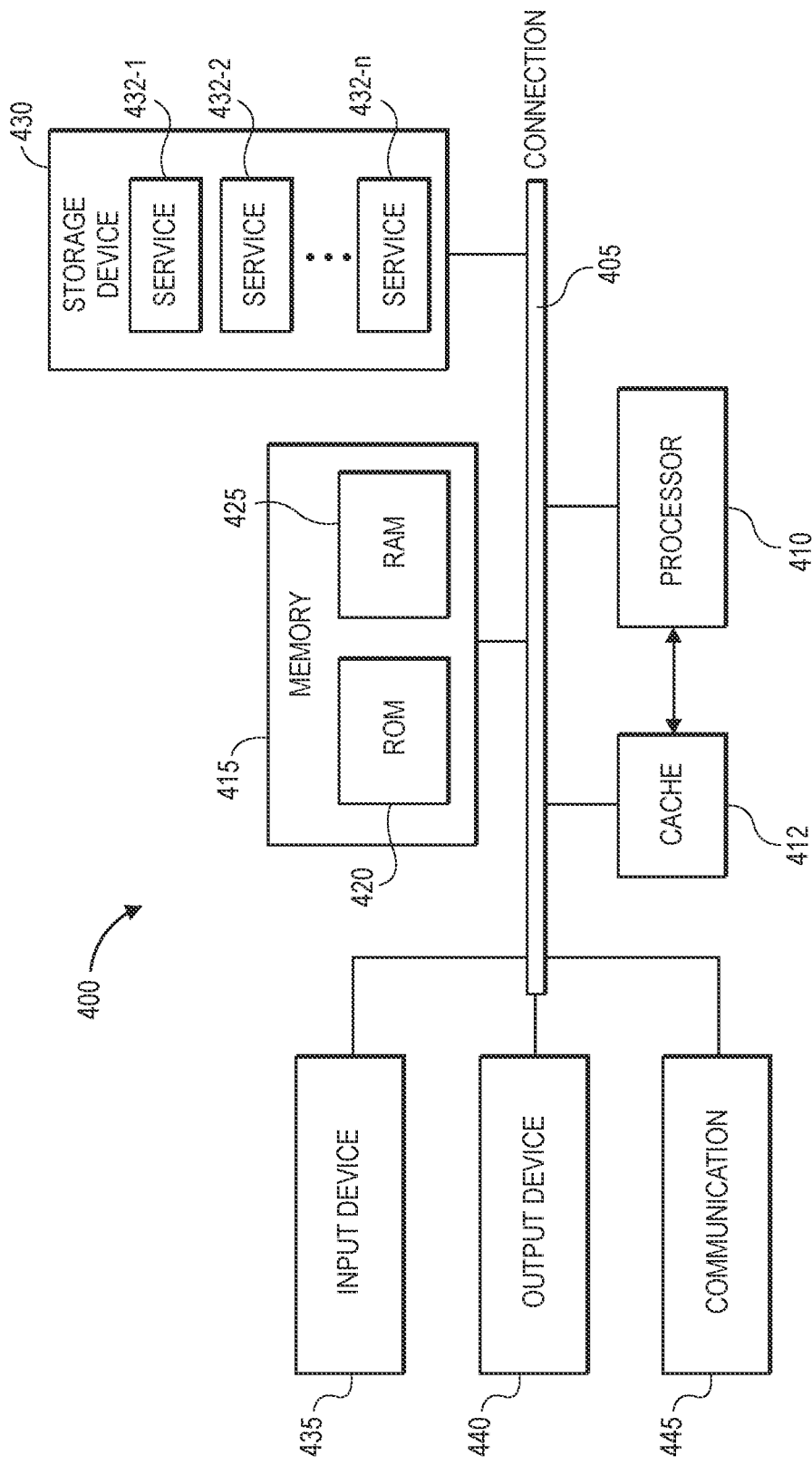
FIG. 4 is an example computing device architecture, in accordance with disclosed implementations.

Components of computing devices or systems described herein may be arranged or configured in any number of discrete architectures. Referring to FIG. 4, a computing device architecture 400 of the present disclosure is shown. In some examples, the computing device architecture 400 may be provided on an edge computing unit, such as the edge computing apparatuses 200 of FIGS. 2A and 2B, the edge computing units 330-*i*, 330-1, 330-2 . . . 330-*n* of FIGS. 3A and 3B, or any other edge computing apparatuses or units. Alternatively, or additionally, the computing device architecture 400 may be provided on any other type or form of computing devices, such as mobile devices (e.g., smartphones, tablet computers, or the like), desktop computers, laptop computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

As is shown in FIG. 4, components of the computing device architecture 400 may be in electrical communication with each other by way of a connection 405, e.g., a bus. The computing device architecture 400 shown in FIG. 4 includes a processor unit 410 (e.g., a CPU, a GPU, or another processor unit) coupled to various components of the computing device architecture 400, including but not limited to a set of memory components 415, e.g., a cache of high-speed memory connected directly with, in close proximity to, or integrated as part of processor 410, such as read-only memory ("ROM") 420 and random-access memory ("RAM") 425. The processor unit 410 may be any general-purpose processor or a special-purpose processor, such as a self-contained system.

The computing device architecture 400 also includes a storage device 430 including one or more sets of data or instructions for performing various services 432-1, 432-2 . . . 432-*n*. The storage device 430 may be a non-volatile memory, a hard disk or another type of computer-readable media that may store data that is accessible to the computing device architecture 400 or other computers, such as magnetic cassettes, flash memory cards, solid state memory devices, digital versatile disks, cartridges, as well as the memory 415, e.g., the ROM 420, the RAM 425, and any others. One or more of the services 432-1, 432-2 . . . 432-*n* may be provided and executed for controlling the processor unit 410 or any other aspect of the computing device architecture 400.

The computing device architecture 400 further includes an input device 435, an output device 440 and a communications interface 445. The input device 435 enables interaction with the computing device architecture 400 and may represent any number of input mechanisms, e.g., a microphone for receiving sounds or speech signals, a touch-sensitive screen for receiving gestures or other manual inputs, or others. The output device 435 may represent any number of output mechanisms, e.g., a display, a projector, a television, a speaker device, or others. The communications interface 445 may be configured to govern or manage inputs received from users via the input device 435 and outputs to be provided to such users via the output device 440.

As used herein, the terms "device," "system" or "unit" need not be limited to any one or a specific number of physical objects (such as one smartphone, one controller, one processing system and so on), and may instead refer to any system having any number of parts that may implement any portions of the present disclosure. Likewise, the terms "device," "system" or "unit" are not limited to any configuration, type, or number of objects.

Devices implementing processes and methods according to these disclosures may include hardware, software, firmware, middleware, microcode, hardware description languages, or any combinations thereof, and may take any of a variety of form factors. When implemented in software, firmware, middleware, or microcode, the program code or code segments to perform the necessary tasks (e.g., a computer-program product) may be stored in a computer-readable or machine-readable medium.

Figure 5A:
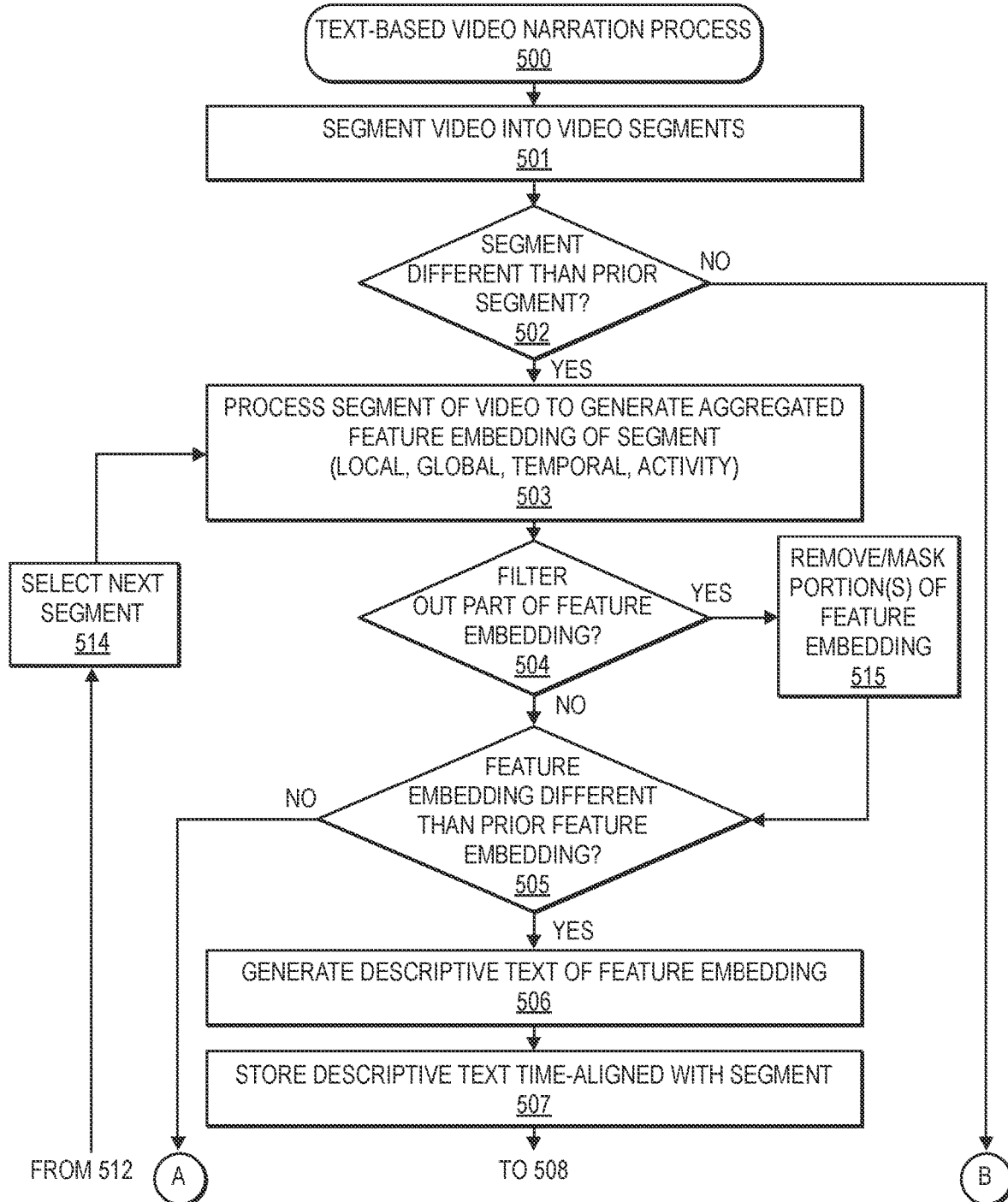
FIGS. 5A and 5B is an example text-based video narration process, in accordance with disclosed implementations.
Figure 5B:
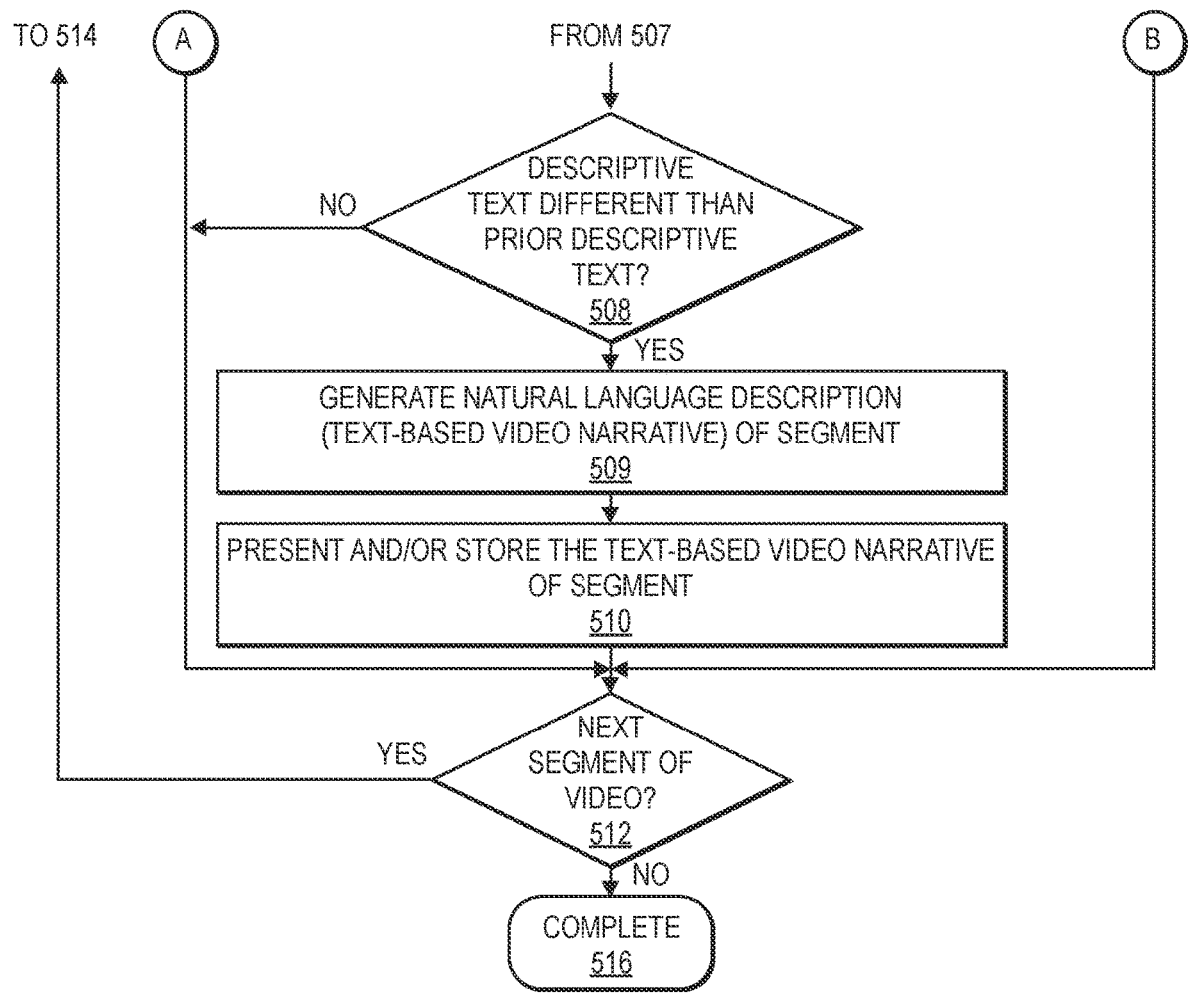

FIGS. 5A and 5B is an example text-based video narration process 500, in accordance with disclosed implementations.

Referring first to FIG. 5A, the example process 500 begins by segmenting a video into a plurality of segments, as in 501. The duration of segments may be the same or different and any length of segments may be utilized. In one example, each video segment is five seconds long. In other implementations, the video segments may be shorter or longer. In addition, in some implementations, the video may be segmented such that the segments overlap in time. For example, each video segment may have a defined segment duration (e.g., five seconds) and overlap by a defined overlap duration (e.g., two seconds). In other implementations, the defined segment duration and/or the defined overlap duration may be shorter or longer.

A segment of the video may then be compared with a prior segment of the video to determine, based on, for example, an image comparison or pixel comparison between frames or key frames of the segment and the prior segment, whether the segment has changed compared to the prior segment, as in 502. If it is determined that the segment has not changed when compared to the prior segment, the example process proceeds to block 512 and continues. If it is determined that the segment of the video has changed compared to the prior segment, the segment of the video may then be processed to generate an aggregated feature embedding representative of the subject matter of the video corresponding to that segment, as in 503. As discussed further below with respect to FIG. 6, one or more attention vision transformers, such as a local semantic attention vision transformer, global semantic attention vision transformer, temporal semantic attention vision transformer, and/or an activity semantic attention vision transformer, may be utilized to generate different embeddings for different aspects of the segment. For example, and as discussed further below, the local semantic attention vision transformer may generate one or more local embeddings, each of the multiple local embeddings representative of individual objects/features (e.g., trees, humans, vehicles, pipes, etc.) included in different regions of the segment. The global semantic attention vision transformer may generate one or more global embeddings that model global dependencies among regions of the segment. The temporal semantic attention vision transform may generate embeddings that model the dependencies among regions or objects/features over the duration of the segment. The activity semantic vision transformer may be trained to generate embeddings describing specific activities detected in the video segment (e.g., door opening, person walking, car driving). The different embeddings may then be combined or aggregated to generate a feature embedding for the segment.

The example process 500 may then determine if some or all of the feature embedding is to be filtered out or masked, as in 504. For example, in some implementations, the disclosed implementations may be trained to only consider specific activities, ignoring all others that may be detected in the video segments. In other implementations, the disclosed implementations, may be trained to only mask or remove specific activities detected in the segment, considering all others. For example, in some implementations, the systems may be trained to ignore the activity of movement of plants (e.g., trees, bushes, etc.) detected in the video segment but to consider all other subject matter depicted in the video segment. In other examples, the system may be trained to filter out segments based on the activity determined for the segment. For example, the system may be trained to mask activities involving a forklift. In such an example, if the activity semantic attention vision transformer generates an embedding indicating a forklift activity, the entire segment or the feature embedding may be masked.

If it is determined that some or all of the segment or feature embedding is to be filtered or masked, the appropriate mask or filter is applied to the feature embedding, as in 515. If it is determined that some or all of the feature embedding for the segment is not to be filtered or masked, or after applying a filter or mask to the feature embedding for the segment, the feature embedding for the segment may be compared to a prior feature embedding of a prior segment to determine if the feature embedding for the segment is different than the feature embedding of the prior segment, as in 505. In some implementations, a distance between the feature embedding and the prior feature embedding may be determined and if the difference is more than a defined distance it may be determined that the feature embedding is different than the prior feature embedding.

Comparing feature embeddings determines whether the subject matter represented in the segment and the prior segment have changed. For example, even if it is determined at decision block 502 that the image comparison between the segment and the prior segment has changed, the comparison of the feature embedding and the prior feature embedding may determine that the represented subject matter between the segment and the prior segment has not changed. As an example, if the first segment includes the subject matter of a beachball on the beach and the camera moves orientation but continues to include the beachball and the beach in the video, the image comparison at decision block 502 may determine that the segment and the prior segment are different. However, comparing the feature embedding of the segment and the prior feature embedding of the prior segment, at decision block 505 it may be determined that the subject matter represented in the segment and the prior segment is not different.

If it is determined at decision block 505 that the feature embedding of the segment and the prior feature embedding of the prior segment are not different (i.e., within the defined distance), the example process 500 proceeds to block 512 and continues. In some implementations, the segment may be discarded, thereby saving memory. If it is determined that the feature embedding of the segment is different than the feature embedding of the prior segment, the feature embedding for the segment may be processed to generate descriptive text that describes the subject matter of the video segment, as in 506. For example, as discussed further below, the feature embedding may be processed by a vision encoder decoder model to convert the embedding into descriptive text that is descriptive of the embedding, subject to any mask or filter applied to the embedding.

The descriptive text may then be time-aligned with the video segment (e.g., a timestamp of the video segment may be associated with the descriptive text, and the time-aligned descriptive text may be stored in a data store as part of a dataset of descriptive text for the video). For example, the time-aligned descriptive text may be stored as part of a .json file and/or any other file or table format, as in 507.

Referring now to FIG. 5B, a determination may then be made as to whether the descriptive text is different than descriptive text of the prior segment of the video, as in 508. If it is determined that the descriptive text is different than the descriptive text of the prior segment of the video, the descriptive text, along with the context of the video up to that point of the video as determined by the example process 500, may be utilized to generate a natural language description of the segment, also referred to herein as a portion of the text-based video narrative of the video that is processed by the example process 500. In one example, the descriptive text and the prior generated text-based video narrative already generated for the video, may be provided to an edge model, such as a large language model ("LLM") operating on the edge with instructions to generate a natural language description of the segment of the video. The text-based video narrative of the prior segment of the video or defined number of prior segments of the video may be utilized by the edge model as context when generating the text-based video narrative for the segment as in 509.

As discussed herein, the edge model(s) may be smaller than traditional, cloud based models, and may be optimized specific for that edge location, thereby requiring fewer computing resources to operate. For example, an LLM operating as an edge model at an edge location may be a smaller LLM, sometimes now referred to as Small Language Models ("SML") that is specifically trained or tuned for the edge location.

After generating the text-based video narrative for the segment of the video, the text-based video narrative may be presented, for example to an operator viewing the video, as in 510. Alternatively, or in addition thereto, the text-based video narrative may be stored and time aligned with the segment of the video, also as in 510. Presentation of the text-based video narrative may be provided audibly, visually, and/or haptically.

After presenting the generated text-based video narrative of the segment or if it is determined at decision block 508 that the descriptive text is not different than the prior descriptive text, the example process 500 determines if there is a next segment of the video to process, as in 512. In some implementations, the example process may segment and process segments of a video in real-time or near real-time. In other implementations, the example process 500 may process video that was previously generated and stored.

If it is determined at decision block 512 that a next segment of the video is available, the example process 500 selects the next segment of the video, as in 514, returns to block 503, and continues. If it is determined that there are no further segments of the video to process, the example process completes, as in 516.

Figure 6:
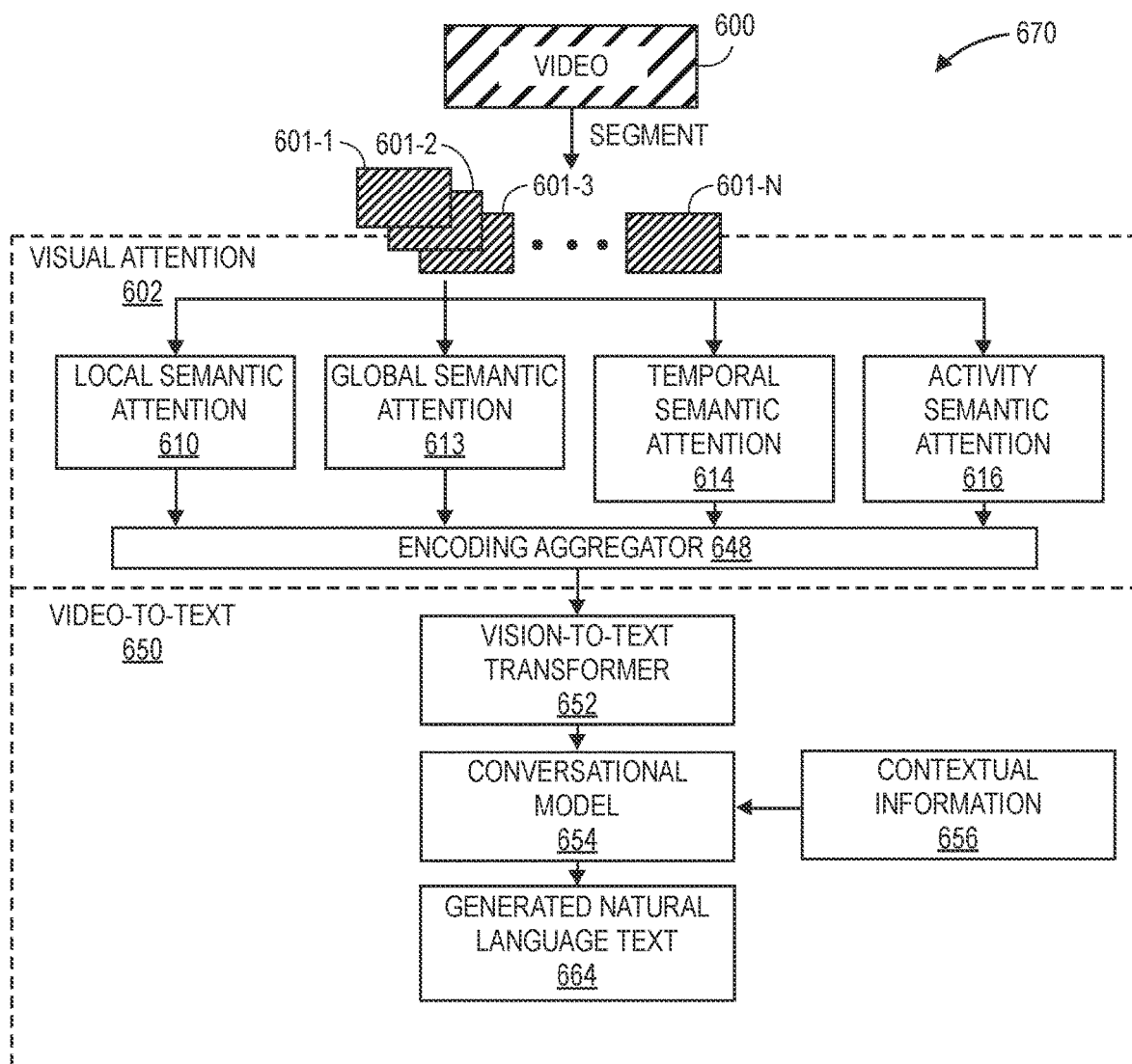
FIG. 6 is an example illustration of a video to natural language generation system, in accordance with disclosed implementations.

FIG. 6 is an example illustration of a video to natural language generation system 670, in accordance with disclosed implementations.

As illustrated, a video 600, such as a video generated from a 2D digital camera at an edge location (which may be at a fixed position or mobile), may be segmented into a plurality of segments 601-1, 601-2, 601-3, through 601-N. Any number of segments may be generated based on, for example, the frame rate of the video, the subject matter of the video, the compression rate of the video, the size of the video, the duration of the video, the compute capacity of the edge computing platform upon which the system 670 is operating, etc. Likewise, in some implementations, the video 600 may be segmented such that the segments overlap in time. For example, each segment may have a segment duration of ten seconds and an overlap duration of two seconds such that each segment overlaps the preceding segment by two seconds and overlaps the subsequent segment by two seconds. In other implementations, the segment duration and/or the overlap durations may be different.

As illustrated, the system 670 may include a visual attention component 602 and a video-to-text component 650.

Turning first to the visual attention component 602, the visual attention component may include a local semantic attention vision transformer 610, a global semantic attention vision transformer 613, a temporal semantic attention vision transformer 614, and/or an activity semantic attention vision transformer 616. Each of the transformers 610, 613, 614, 616 may be utilized to generate different embeddings for different aspects of the video segment being processed. For example, the local semantic attention vision transformer 610 may generate one or more local embeddings, each of the multiple local embeddings representative of an individual object/feature (e.g., tree, human, vehicle, pipe, etc.) included in a region of the segment. The global semantic attention vision transformer 613 may generate one or more global embeddings that model global dependencies among regions of the video segment. The temporal semantic attention vision transformer 614 may generate embeddings that model the dependencies among regions over the duration of the segment. The activity semantic vision transformer 616 may be trained to generate embeddings describing specific activities detected in the video segment (e.g., door opening, person walking, car driving).

The local semantic attention vision transformer 610 may process or identify regions of frames of the segment and process each of those regions to generate intra-region embeddings indicative of the object represented in that region. In some implementations, regions may be pre-defined. In other implementations, an initial processing of each frame of the segment may be performed to determined regions within each frame that correspond to objects (e.g., humans, vehicles, trees, buildings, etc.) represented in the frame. For example, a feature detection engine, such as a RESNET50, wavelet transformer, or other visual encoder may process frames of the segments to define regions around detected objects. The transformer may then generate embeddings for each region, thereby generating an embedding corresponding to each object/feature represented in each region of the segment.

The global semantic attention vision transformer 613 may process or identify relationships between regions of the frames of the segment. For example, global inter-region feature propagation may be utilized to determine dependencies among regions of each frame of the segment. For example, if a region of the frame of a person and an adjacent region includes a car, the global semantic attention vision transformer 613 may determine a dependency between those two features/objects and generate an embedding indicative of the dependencies. Like the local semantic attention vision transformer 610, the global semantic attention vision transformer 613 may generate multiple embeddings for the segment, each embedding indicating different dependencies determined between different features/objects represented in the frames of the segment.

The temporal semantic attention vision transformer 614 may consider each frame of the segment and determine features across the duration of those frames. For example, looking at the features determined in each frame of the segment, the temporal semantic attention vision transformer 614 may determine if the feature/object is moving, stationary, and/or other changes that have occurred to the feature during the duration of time of the segment. The temporal semantic attention vision transformer 614 may then generate an embedding representative of changes determined over the duration of time of the segment for each feature/object represented in the segment.

Finally, the activity semantic attention vision transformer 616 may be trained to determine whether specific activities are detected in the frames of the segment. For example, activity semantic attention vision transformer 616 may be trained to detect any of a number of activities (e.g., person walking, forklift moving, pressure gauge changing, rain, person touching a security camera, etc.). For example, the activity semantic attention vision transformer 616 may be trained on video clips of an activity that is to be detected along with labels/text describing the activity. For example, a plurality of video clips of a person opening a door along with the labels "door opening" may be provided and used to train the activity semantic attention vision transformer 616 to detect the activity of a door opening when processing video segments. If that is the only activity for which the activity semantic attention vision transformer 616 is trained, when processing video segments, the activity semantic vision transformer will generate a null embedding when the activity of a door opening is not detected. In comparison, when the activity of a door opening is detected, the activity semantic vision transformer 616 will generate an embedding for the segment indicating that the activity of a door opening was detected during the segment.

The activity semantic attention vision transformer 616 may be trained to detect any number of activities and those activities may be specific to the edge location or specific to any monitoring situation. For example, the activity semantic attention vision transformer 616 may be trained to detect over one hundred different activities. In such an example, when one or more of those activities are detected, an activity embedding indicative of the detected activity is generated. If none of the trained activities are detected, a null embedding may be generated by the activity semantic attention vision transformer 616. If multiple activities are detected during the segment, the activity semantic attention vision transformer 616 may generate a different embedding for each different detected activity.

Each of the embeddings generated by each of the local semantic attention vision transformer 610, the global semantic attention vision transformer 613, temporal semantic attention vision transformer 614, and the activity semantic attention vision transformer 616 may be aggregated by an encoding aggregator 648 and included in a feature embedding for the segment of the video. In some implementations, each of the embeddings may be compiled or combined into the feature embedding and otherwise may remain unchanged.

Turning now to the video-to-text component 650, the feature embedding for the segment of the video may be processed by a vision-to-text transformer 652, such as a multi-head attention transformer, to convert the feature embedding into descriptive text. For example, a multi-head vision-to-text transformer 652 may be trained to process each of the different embeddings (local embeddings, global embeddings, temporal embeddings, activity embeddings) with different heads of the transformer to generate particular descriptive text outputs based on the local embeddings, global embeddings, and temporal embeddings included in the feature embedding and further based on the activity embedding indicating a specific activity detected in the segment. For example, the vision-to-text transformer 652 may be trained to use one set of descriptive text when a first activity is indicated by an activity embedding and a second set of descriptive text when a second activity is indicated by an activity embedding. The vision-to-text transformer 652 may then determine the appropriate descriptive text outputs from the selected set of descriptive text based on the local embeddings, global embeddings, and temporal embeddings included in the feature embedding for the video segment.

Still further, the vision-to-text transformer 652, and/or a masking component positioned before the vision-to-text transformer 652 may further apply any defined masks or filters to eliminate any aspects of the feature embedding that are not to be described. For example, filters may be defined to mask specific objects (e.g., trees, plants, streets, curbs, etc.), specific activities, specific temporal aspects (e.g., trees swaying the wind), etc. In some implementations, masks may be specifically applied for different edge locations and/or for different cameras of an edge location, etc.

The descriptive text may be further processed by a conversational model 654, such as an LLM or SLM that is trained for the edge location to convert the descriptive text into natural language text 664 outputs that describe the activity of the segment in a natural language. As discussed herein, the natural language text 664 outputs may be, for example, presented as a text-based video narrative that describes the subject matter of the video in a natural language, stored in memory, transmitted, etc. For example, the descriptive text, along with the activity determined for the segment, may be provided to a conversational model 654 that is specifically trained for the edge location with instructions that the conversational model provide a natural language output that describes the activity represented in the subject matter of the video segment. In some implementations, the conversational model 654 may also receive contextual information 656 that the conversational model 654 may utilize to further tune the natural language response to the location, the current video narration, etc. For example, the contextual information may include information about the natural language narration that has already been generated for the video, the subject matter determined for the video, the user interest or user history, the edge location, etc.

Figure 7:
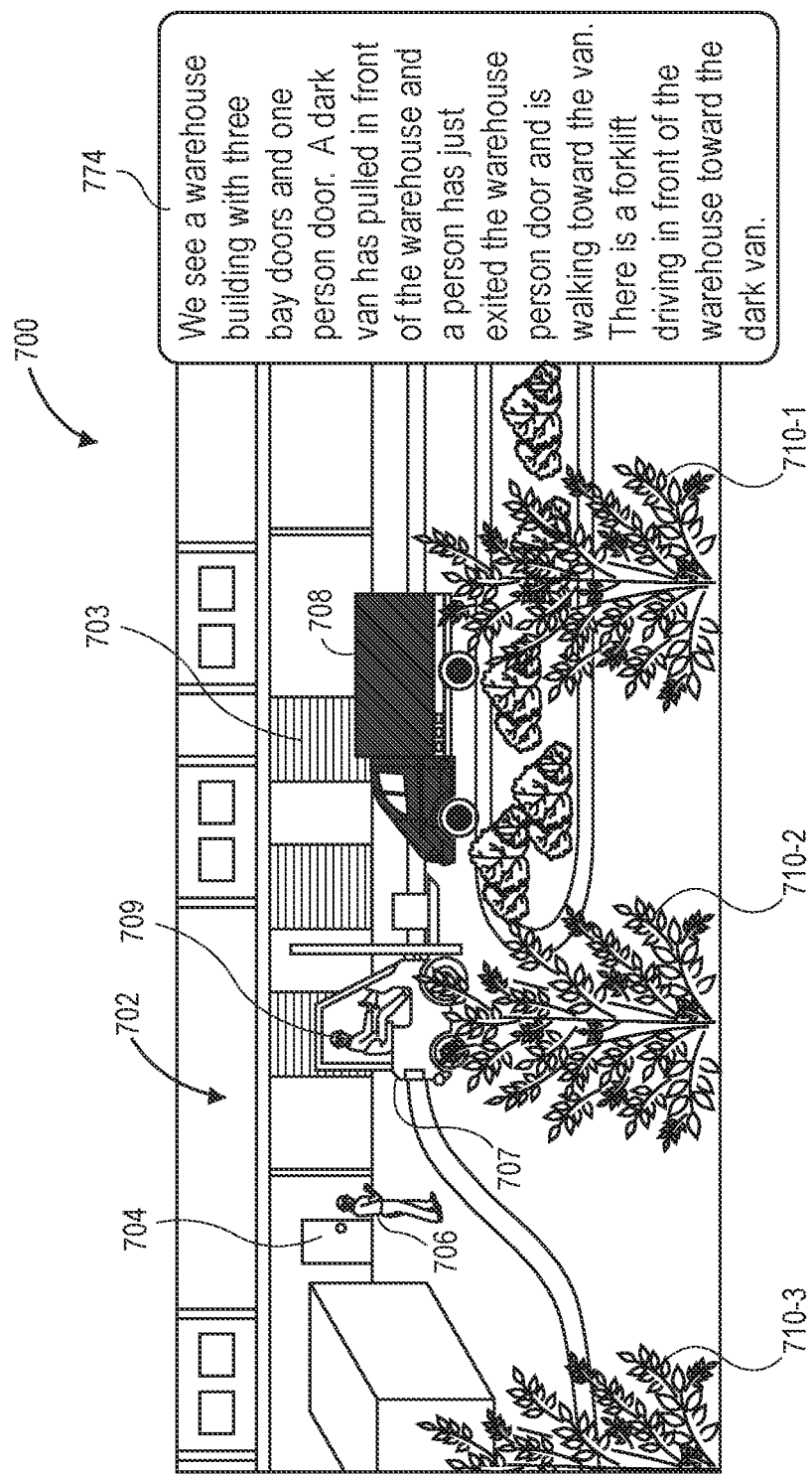
FIG. 7 is an example illustration of a frame of a video and corresponding text-based video narration describing the subject matter of the video, in accordance with disclosed implementations.

FIG. 7 is an example illustration 700 of a frame of a video and corresponding text-based video narration describing the subject matter of the video, in accordance with disclosed implementations.

As discussed above with respect to FIGS. 5 and 6, the frame of the video may be processed to generate local embeddings, global embeddings, temporal embeddings, and activity embeddings, which may be aggregated into a feature embedding for the segment. In the illustrated example, the local embeddings may include local embeddings for each of the user 706, the door 704, the dark van 708, the forklift 707, the forklift operator 709, the trees 710-1, 710-2, 710-3, warehouse doors 703, etc. The global embeddings may include, for example, a global embedding indicating the dependency between the forklift operator 709 and the forklift 707, a dependency between the forklift 707 and the dark van 708, a dependency between the warehouse doors 703 and the warehouse 702, etc. The temporal embeddings generated for the segment represented by the illustration 700 may include an embedding indicating that the forklift 707 is navigating toward the dark van 708, an temporal embedding indicating that the dark van 708 has navigated to the front of the warehouse 702, an embedding that the user 706 exited the door 704, a temporal embedding that the trees 710-1, 710-2, 710-3 are swaying the wind, etc. The activity embeddings may include an embedding indicating an open door activity for the activity of the user 706 opening and passing through the door 704, and activity embedding indicating a forklift operation activity that the forklift 707 is being operated, etc.

The feature embedding that includes the aggregation of each of the local embeddings, global embeddings, temporal embeddings, and activity embeddings may then be further processed by a video-to-text component, as discussed above, to generate natural language text output descriptive of the subject matter of the video, excluding any aspects that are masked or filtered out. The resulting natural language text output may then be presented. For example, as illustrated in FIG. 7, the natural language text output may be presented concurrent with the presentation of the video. In this example, the natural language text output that is descriptive of the video may include the following text-based video narrative: "We see a warehouse building with three bay doors and one person door. A dark van has pulled in front of the warehouse and a person has just exited the warehouse person door and is walking toward the dark van. There is a forklift driving in from of the warehouse toward the dark van." In the illustrated example, because the video-to-text component was trained to mask out embeddings relating to plants or movement of plants, there is no description in the text-based video narrative 774 of the trees swaying in the wind.

As discussed, the text-based video narrative determined for a video may be presented, stored, etc. In some implementations, the text-based video narrative may be time aligned and stored with the video. In other examples, the text-based video narrative may be used to identify portions of the video data that are duplicative and/or not needed that may be deleted/removed from memory or excluded from a transmission of the video data, etc.

Figure 8A:
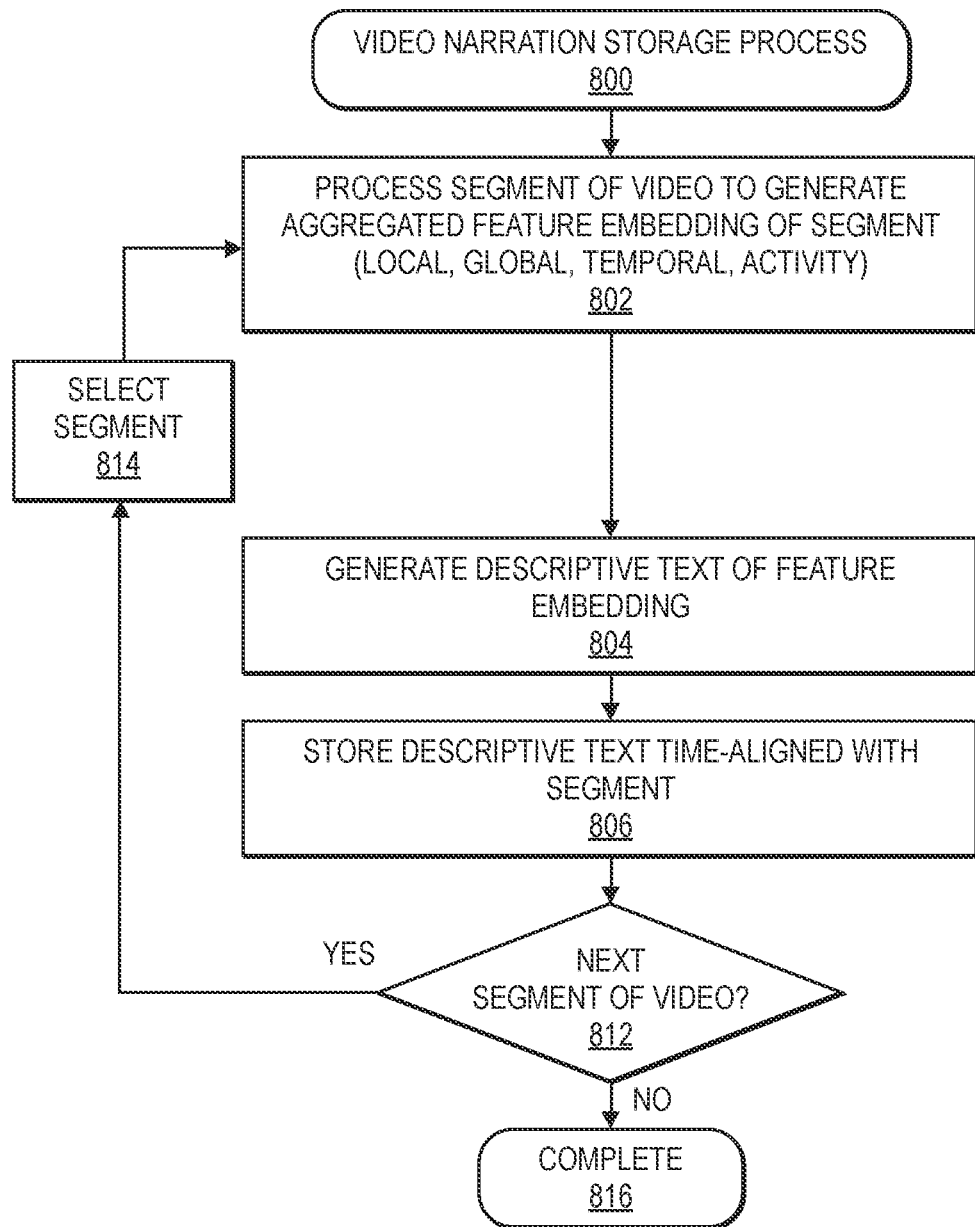
FIG. 8A is an example text-based video narration storage process, in accordance with disclosed implementations.

For example, FIG. 8A is an example text-based video narration storage process 800, in accordance with disclosed implementations.

The example process 800 begins by processing a segment of video to generate an aggregated feature embedding of the segment that includes local embeddings, global embeddings, temporal embeddings, and activity embeddings descriptive of the segment of the video, as in 802. Generating of the feature embedding for a segment and the aggregated local embeddings, global embeddings, temporal embeddings, and activity embeddings is discussed above.

The example process may then generate descriptive text based on the feature embedding of the segment, as in 804. As discussed above, the descriptive text may be generated based on, for example, the activity(ies) determined for the segment, and/or based on the local, global, and temporal embeddings of the feature embedding of the segment.

In the example illustrated with respect to FIG. 8A, the descriptive text is then time-aligned and stored with the video segment, as in 806. A determination may then be made as to whether a next segment of the video is to be processed, as in 812. As discussed, the disclosed implementations may be used to process video in real-time, near real-time, and/or to process pre-existing video. If it is determined that there is another segment of the video to process, the example process selects the next segment, as in 814, returns to block 802, and continues. If there are no additional segments to process, the example process 800 completes, as in 816.

Figure 8B:
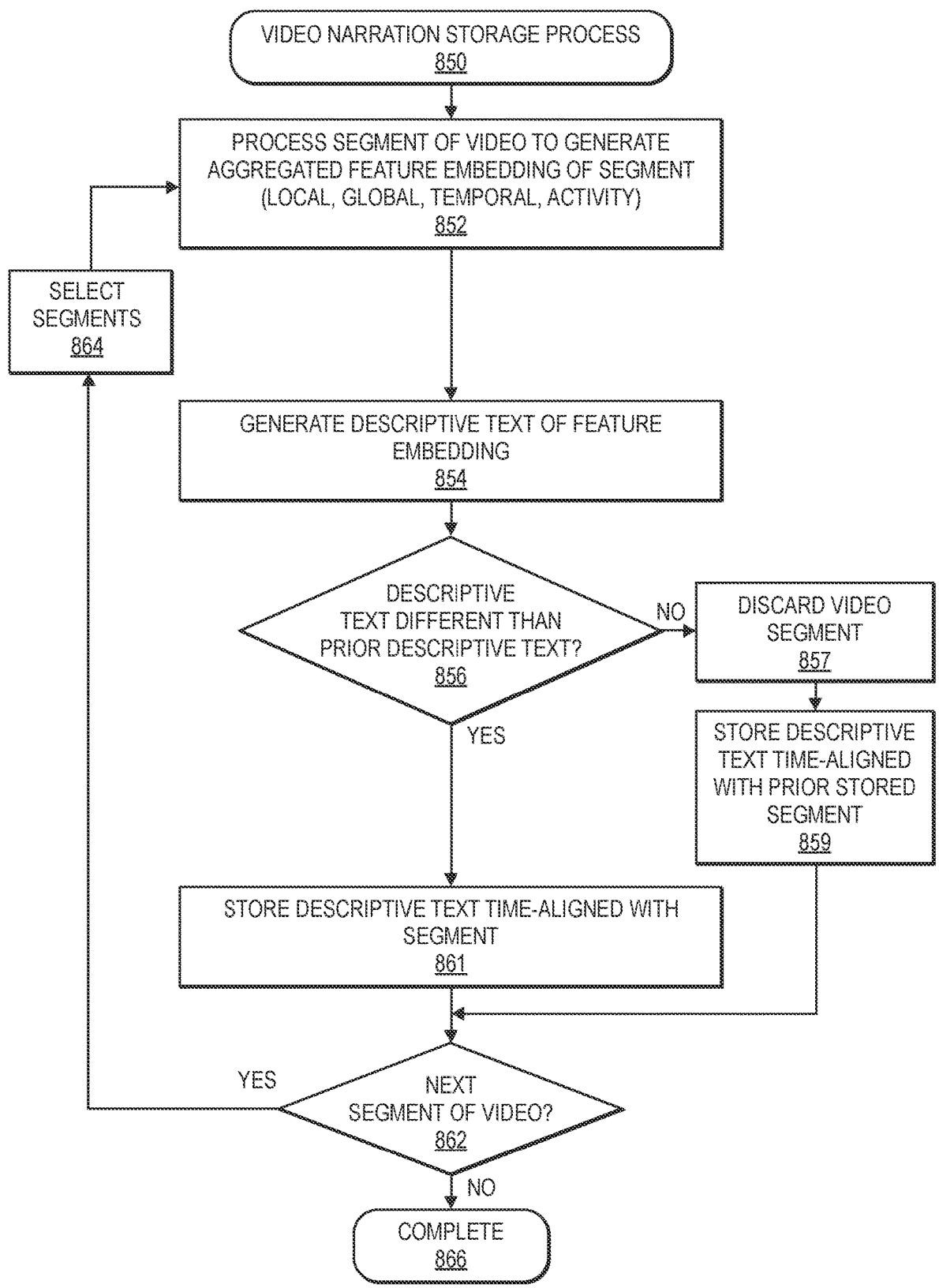
FIG. 8B is another example text-based video narration storage process, in accordance with disclosed implementations.

FIG. 8B is another example text-based video narration storage process 850, in accordance with disclosed implementations.

The example process 850 begins by processing a segment of video to generate an aggregated feature embedding of the segment that includes local embeddings, global embeddings, temporal embeddings, and activity embeddings descriptive of the segment of the video, as in 852. Generating of the feature embedding for a segment and the aggregated local embeddings, global embeddings, temporal embeddings, and activity embeddings is discussed above.

The example process may then generate descriptive text based on the feature embedding of the segment, as in 854. As discussed above, the descriptive text may be generated based on, for example, the activity(ies) determined for the segment, and/or based on the local, global, and temporal embeddings of the feature embedding of the segment.

In the example illustrated with respect to FIG. 8B, rather than storing all the video, a determination is made as to whether the descriptive text is different than the prior descriptive text, as in 856. The prior descriptive text may be, for example, the descriptive text determined for the immediately preceding segment of the video, or the descriptive text determined for a plurality of immediately preceding segments of the video. In some implementations, the descriptive text may be semantically compared to determine if the overall content of the descriptive text and the prior descriptive text are different (rather than making an exact comparison).

If it is determined that the descriptive text is not different than the prior descriptive text, the video segment may be determined to not include any new information (duplicative) and discarded, as in 857. If the video segment is discarded, the descriptive text generated for the now discarded segment may be time-aligned with the prior stored video segment, as in 859. Retaining the descriptive text for the discarded video segment provides information about the video segment and continuity of the video.

If it is determined that the descriptive text is different than the prior descriptive text, the descriptive text is then time-aligned and stored with the video segment, as in 861. In some implementations, rather than storing the video segment, only a subsection or keyframe(s) of the segment may be stored, thereby reducing storage and/or transmission requirements for the video. In such an example, the descriptive text and the keyframe(s) could later be used to reproduce the video segment.

A determination may then be made as to whether a next segment of the video is to be processed, as in 862. As discussed, the disclosed implementations may be used to process video in real-time, near real-time, and/or to process pre-existing video. If it is determined that there is another segment of the video to process, the example process selects the next segment, as in 864, returns to block 852, and continues. If there are no additional segments to process, the example process 850 completes, as in 866.

In addition to generating text-based video narratives that describe a video, the disclosed implementations may also be used to provide a question and answer ("Q&A") session through which an operator may provide queries relating to the subject matter of a video (or multiple videos) and receive natural language responses to those queries. As discussed, the Q&A sessions may be based on the subject matter of a single video, the subject matter of multiple videos (e.g., multiple videos of an edge location) that may have occurred at the same or different times, the subject matter of a single video and one or more sensor data, or the subject matter of multiple videos and one or more sensor data.

Figure 9A:
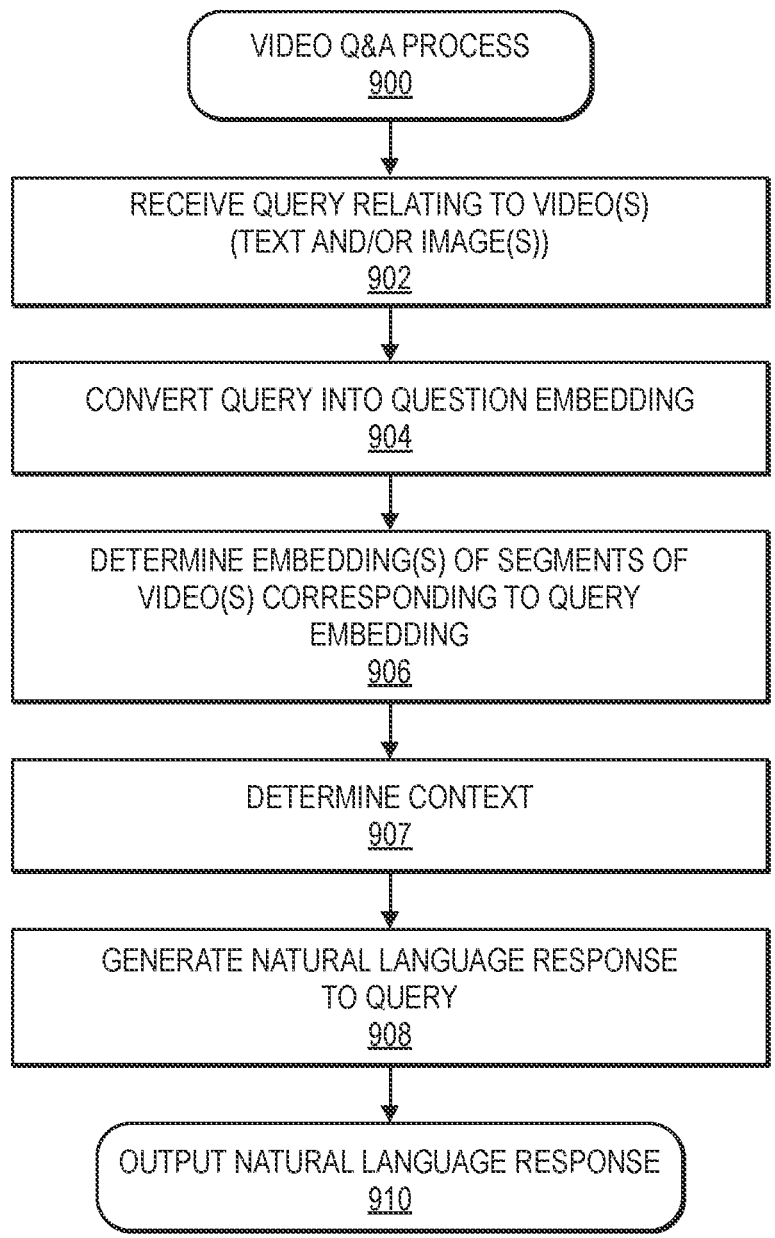
FIG. 9A is an example text-based video question and answer process, in accordance with disclosed implementations.

For example, FIG. 9A is an example text-based video question and answer process 900, in accordance with disclosed implementations.

The example process 900 begins upon receipt of a query relating to a video(s), as in 902. The query may be a narrative text based input, an audio input, a visual input (e.g., sign language), a haptic input, etc. In other implementations, the input may be an image(s) or a combination of image(s) and text. For example, the input may be an image of an object (e.g., person, vehicle, etc.) with a text query asking if the object appears in the video.

In the example process 900, the query may be converted into a query embedding, as in 904, or a vector or set of values that are semantic descriptors of the query. For example, a model such as a transformer having one or more encoders or decoders may convert the query, whether text, image(s), or a combination of text and image(s) into an embedding. For example, the query may be received by one or more devices or systems at a local site or edge location and transmitted, e.g., via a local network, to an edge computing unit or other computer system at the local site or edge location.

Based on the query embedding, one or more feature embeddings corresponding to the video(s) may be determined, as in 906. For example, the one or more feature embeddings of the video(s) may be identified as those that are nearest or most similar to the query embedding. Moreover, the one or more embeddings may be selected subject to a distance threshold, such that only embeddings that are within a predetermined distance of the query embedding, as projected into a vector space, may be selected. As is known, embeddings may be projected into a common vector space (e.g., 768-dimension dense vector space) based on the values or dimensions of the embeddings.

In some implementations, a defined number of embeddings may be selected (e.g., three) as responsive to the query embedding, such that not more than the defined number of nearest or most similar embeddings are selected. Moreover, the defined number of embeddings may be selected in any manner. Alternatively, in some implementations, there need not be any limit on a number of embeddings that are identified as nearest or most similar to the query embedding.

Because a feature embedding is generated for each segment of the video, multiple feature embeddings may be in response to a query. For example, and referring briefly to FIG. 10A, the query 1010-1 "Did the forklift move during the video?" may be determined to correspond to many feature embeddings generated for the query. For example, each frame in which the transition embedding of the feature embedding indicates that the forklift is moving during the duration of the segment may be determined as responsive to the query. In such an example, all of the feature embeddings corresponding to those segments of the video may be determined as responsive to the query.

In addition to determining one or more feature embeddings, a context of the video, the user, and/or the session may be determined, as in 907. For example, if the user has already provided a query and received a response, the context relating to that Q&A may be determined. Likewise, the overall context of the video may be determined. In some implementations, the contextual data may include, but need not be limited to, any of the history of the Q&A session, any guidelines or requirements for processing queries received from users, guidelines or requirements for generating responses in reply to such queries, the overall subject matter of the video, etc.

Finally, the determined feature embedding(s) and the determined context may be utilized to generate a natural language response to the query, as in 908. In some implementations, the descriptive text generated in accordance with the disclosed implementations for each of the determined feature embeddings may be obtained from data storage and provided, along with the determined context, to a conversational model operating on the computing system provided at the edge location, along with instructions to generate a natural language response to the query based on the descriptive text and the corresponding context. For example, the conversational model may be a type or variant of an LLM configured to receive inputs having any number of parameters. The conversational model may rely on one or more transformers or other machine learning models, algorithms or techniques, to receive sequences of words as inputs, and to recursively generate text-based outputs. In some implementations, the conversational model may have a transformer-based architecture having any number or type of activation functions or other attention mechanisms. The conversational model may rely on any positional embeddings, or other embeddings, and execute any normalization techniques. The conversational model may be trained to generate outputs using any type or form of training dataset, including but not limited to domain-specific datasets as well as other data sources that may be publicly or privately obtained, such as repositories, books, papers, code, sites, or others.

Figure 10A:
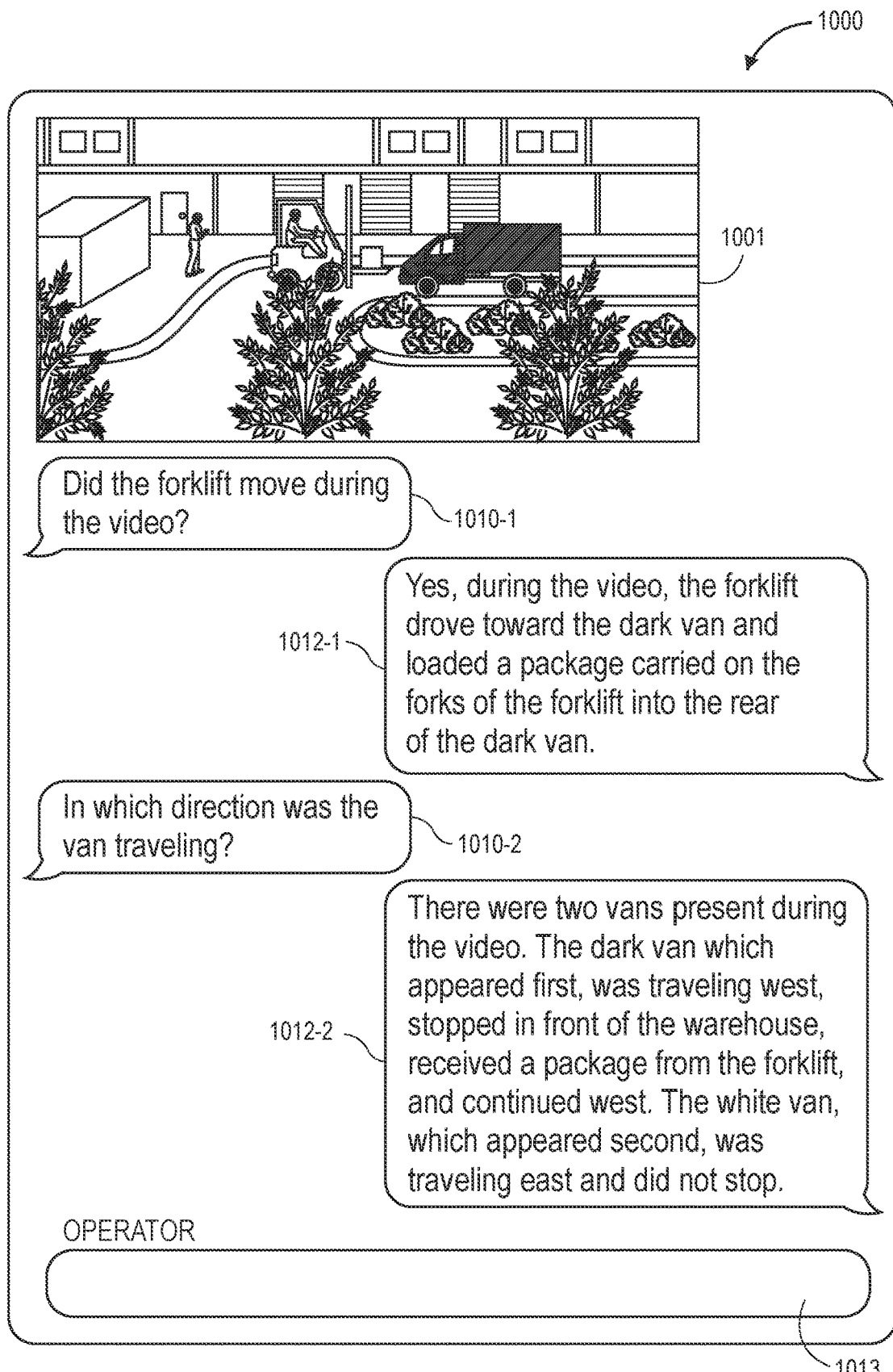
FIG. 10A is an illustration of a video and corresponding question and answer session regarding the content of the video, in accordance with disclosed implementations.

Continuing with the above example discussed with respect to FIG. 10A of responding to the query 1010-1 of "Did the forklift move during the video?", the conversational model may process the context and the descriptive text for each of the feature embeddings determined to be responsive to the query, each of which include time-stamps corresponding to the segments of the video, to generate a natural language response 1012-1 of "Yes, during the video, the forklift drove toward the dark van and loaded a package carried on the forks of the forklift into the rear of the dark van."

The example process 900 completes by presenting the natural language response as an output that is responsive to the query, as in 910. For example, the natural language response may be presented as a text based output presented on a display, an audio based output that is audibly output through a transducer, a haptic output, etc. For example, where the response includes a set of words, the set of words may be shown on a display of a device from which the user provided the query, or on another display of another device in association with the user. Alternatively, or additionally, audible signals representing the set of words may be emitted from speakers within a vicinity of the user, e.g., in headphones, earphones or "ear buds" worn by the user, or speakers mounted at or near a location where the user provided the query.

The response generated by the conversational model in reply to the query may take any form. In some implementations, the response may be a set of words provided in an unstructured format or, alternatively, arranged in phrases, sentences or paragraphs. Moreover, the response may be presented to the user in any manner. For example, in some implementations, the response may be displayed to the user on one or more displays, e.g., on a display of a computer device utilized by the user to provide the text-based query, or any other displays of any other devices that may be provided at a local site or edge location. Alternatively, or additionally, the response may be presented audibly or in any other manner, such as by causing sounds representing words of the response to be audibly played by one or more speakers or other acoustic emitters at the local site or edge location.

In some implementations, the corresponding segments of the video, or links to those segments of the video may also be included in the response to the query.

Figure 9B:
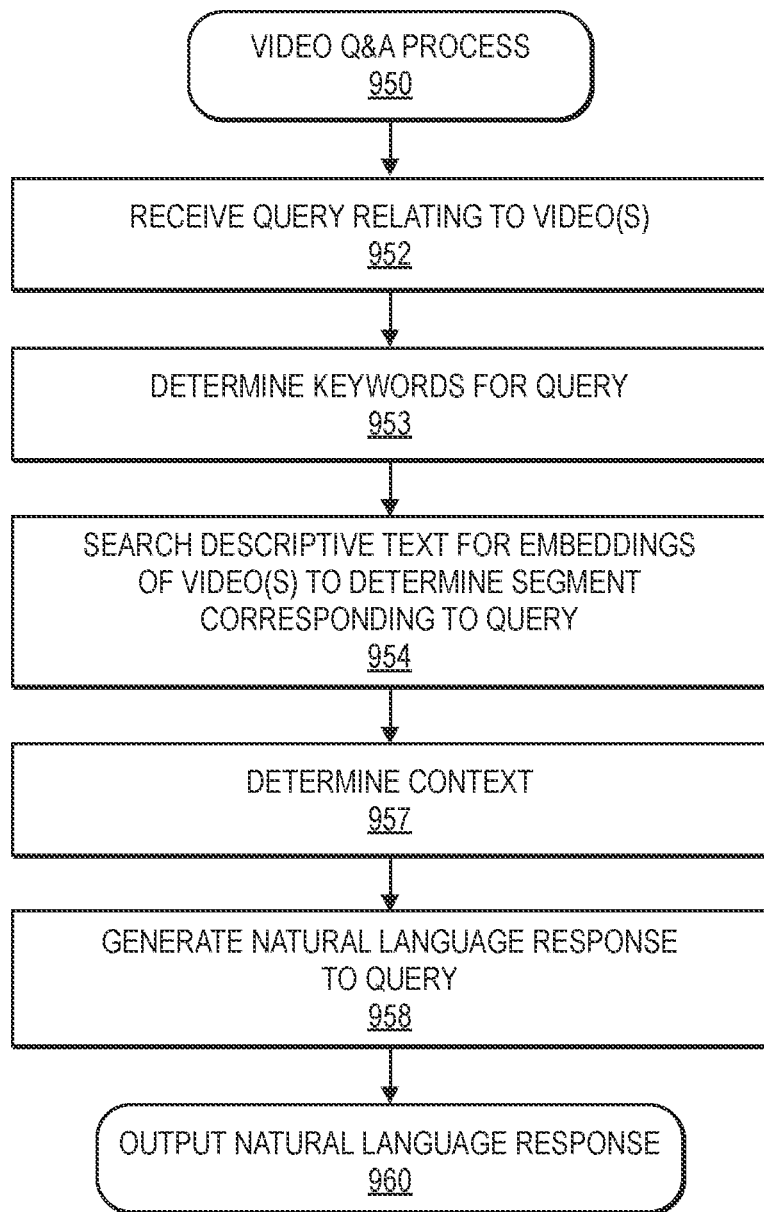
FIG. 9B is another example text-based video question and answer process, in accordance with disclosed implementations.

FIG. 9B is another example text-based video question and answer process 950, in accordance with disclosed implementations.

The example process 950 begins upon receipt of a query relating to a video(s), as in 952. The query may be a narrative text based input, an audio input, a visual input (e.g., sign language), a haptic input, etc.

The query may then be processed to determine one or more keywords or keyword pairs of the query, as in 953. Any of a variety of keyword processing techniques may be used to determine keywords of the query. In some implementations, the keywords may be refined based on the context of the video, the particularities of the edge location, etc.

In the example process 950, the descriptive text generated and stored for segments of the video(s), as discussed above, may then be queried based on the keywords determined for the query, as in 954, to determine one or more segments of the video that are responsive to the query.

Because descriptive text is generated for each segment of the video, based on the corresponding feature embeddings, multiple segments of the video may be determined as responsive to a query. For example, and referring briefly to FIG. 10A, the query 1010-1 "Did the forklift move during the video?" may be determined to correspond to many segments of the video. For example, each frame in which the transition embedding of the feature embedding indicates that the forklift is moving during the duration of the segment, and thus descriptive text generated indicating that the forklift is moving during the segment, may be determined as responsive to the query. In such an example, all of the segments of the video that include descriptive text corresponding to the query may be determined as responsive to the query.

In addition to determining one or more segments of the video that are responsive to the query, a context of the video, the user, and/or the session may be determined, as in 957. For example, if the user has already provided a query and received a response, the context relating to that Q&A may be determined. Likewise, the overall context of the video may be determined. In some implementations, the contextual data may include, but need not be limited to, any history of the Q&A session, any guidelines or requirements for processing queries received from users, guidelines or requirements for generating responses in reply to such queries, the overall subject matter of the video, etc.

Finally, the descriptive text and/or the feature embedding(s) for the determined segments of the video, generated as discussed above, along with the determined context, may be utilized to generate a natural language response to the query, as in 958. For example, the descriptive text generated in accordance with the disclosed implementations for each of the determined segments, along with the determined context, may be provided to a conversational model operating on the computing system provided at the edge location, along with instructions to generate a natural language response to the query based on the descriptive text and the corresponding context. For example, the conversational model may be a type or variant of an LLM configured to receive inputs having any number of parameters. The conversational model may rely on one or more transformers or other machine learning models, algorithms or techniques, to receive sequences of words as inputs, and to recursively generate text-based outputs. In some implementations, the conversational model may have a transformer-based architecture having any number or type of activation functions or other attention mechanisms. The conversational model may rely on any positional embeddings, or other embeddings, and execute any normalization techniques. The conversational model may be trained to generate outputs using any type or form of training dataset, including but not limited to domain-specific datasets as well as other data sources that may be publicly or privately obtained, such as repositories, books, papers, code, sites, or others.

Continuing with the above example discussed with respect to FIG. 10A of responding to the query 1010-1 of "Did the forklift move during the video?", the conversational model may process the context and the descriptive text for each of the segments determined to be responsive to the query, each of which include time-stamps corresponding to the segments of the video, to generate a natural language response 1012-1 of "Yes, during the video, the forklift drove toward the dark van and loaded a package carried on the forks of the forklift into the rear of the dark van."

The example process 950 completes by presenting the natural language response as an output that is responsive to the query, as in 960. For example, the natural language response may be presented as a text based output presented on a display, an audio based output that is audibly output through a transducer, a haptic output, etc. For example, where the response includes a set of words, the set of words may be shown on a display of a device from which the user provided the query, or on another display of another device in association with the user. Alternatively, or additionally, audible signals representing the set of words may be emitted from speakers within a vicinity of the user, e.g., in headphones, earphones or "ear buds" worn by the user, or speakers mounted at or near a location where the user provided the query.

The response generated by the conversational model in reply to the query may take any form. In some implementations, the response may be a set of words provided in an unstructured format or, alternatively, arranged in phrases, sentences or paragraphs. Moreover, the response may be presented to the user in any manner. For example, in some implementations, the response may be displayed to the user on one or more displays, e.g., on a display of a computer device utilized by the user to provide the text-based query, or any other displays of any other devices that may be provided at a local site or edge location. Alternatively, or additionally, the response may be presented audibly or in any other manner, such as by causing sounds representing words of the response to be audibly played by one or more speakers or other acoustic emitters at the local site or edge location.

In some implementations, the corresponding segments of the video, or links to those segments of the video may also be included in the response to the query.

FIG. 10A is an illustration 1000 of a video and corresponding question and answer session regarding the content of the video, in accordance with disclosed implementations.

As discussed above, a user may submit a query, such as query 1010-1 "Did the forklift move during the video?" relating to one or more videos, such as the video represented by the frame 1001. In response to the query 1010-1, the disclosed implementations, may process the query using any one or more of the above described video Q&A processing techniques and generate a natural language response that is in context and responsive to the query, such as response 1012-1 "Yes, during the video, the forklift drove toward the dark van and loaded a package carried on the forks of the forklift into the rear of the dark van."

The user may continue interacting with the disclosed implementations as part of the Q&A session, asking additional and/or follow-up questions. For example, the user may submit a second query 1010-1 of "In which direction was the van traveling?" The submitted query may again be processed using any one or more of the above described video Q&A processing techniques and generate a natural language response that is in context with the session, considering prior queries and answers of the session, and responsive to the query. In the illustrated example, the disclosed implementations may process the second query 1010-2, along with the context to determine that the user is likely referring to the dark van as part of the query 1010-2. This determination may be made, for example, based on the prior Q&A that discussed a dark van. If the ambiguity in the question, in this instance which van the user is referring to, can be definitively resolved, the response may be specific to that determination. However, if the ambiguity in the question cannot be fully resolved, the conversational model may provide a more complete answer that responds to all possible options. Alternatively, rather than responding to the query, the conversational model may output a responsive query asking for clarification.

For example, in processing the query, the video, and the context, the conversational model may determine that there was more than one van present during the video. As a result, the query 1010-2 is ambiguous to which van the user is referring. In one example, the conversational model may respond with a response query asking if the user is referring to the dark van. In another example, as illustrated in FIG. 10A, the natural language response 1012-2 may provide a description for both vans that are responsive to the query, such as "There were two vans present during the video. The dark van, which appeared first, was traveling west, stopped in front of the warehouse, received a package from the forklift, and continued west. The white van, which appeared second, was traveling east and did not stop." As will be appreciated, any number of permutations of a natural language response may be generated and output that is in context and responsive to the query.

The user may continue the Q&A session by, for example, inputting another query in the input box 1013.

While the example illustrated and discussed with respect to FIG. 10A relates to a single video, in other implementations, the Q&A session may include video from multiple cameras and/or from one or more cameras and one or more other sensors. For example, a football stadium may include hundreds or thousands of cameras, gate turnstile sensors/counters, seating occupancy sensors, etc. In such an example, a user may participate in a Q&A session, in accordance with the disclosed implementations, in which some or all of the cameras and/or other sensors are processed, along with context, when responding to queries submitted by the user. For example, the user may submit a query as to which gates have the longest processing time for allowing entry of patrons. The disclosed implementations may process all camera video and gate turnstile sensor data connected to the edge unit at the stadium and provide a natural language response to the query. As will be appreciated, there is an infinite number of different use cases and scenarios in which the disclosed implementations may be utilized to provide Q&A sessions based on video data from one or more cameras and/or sensor data from one or more sensors.

Figure 10B:
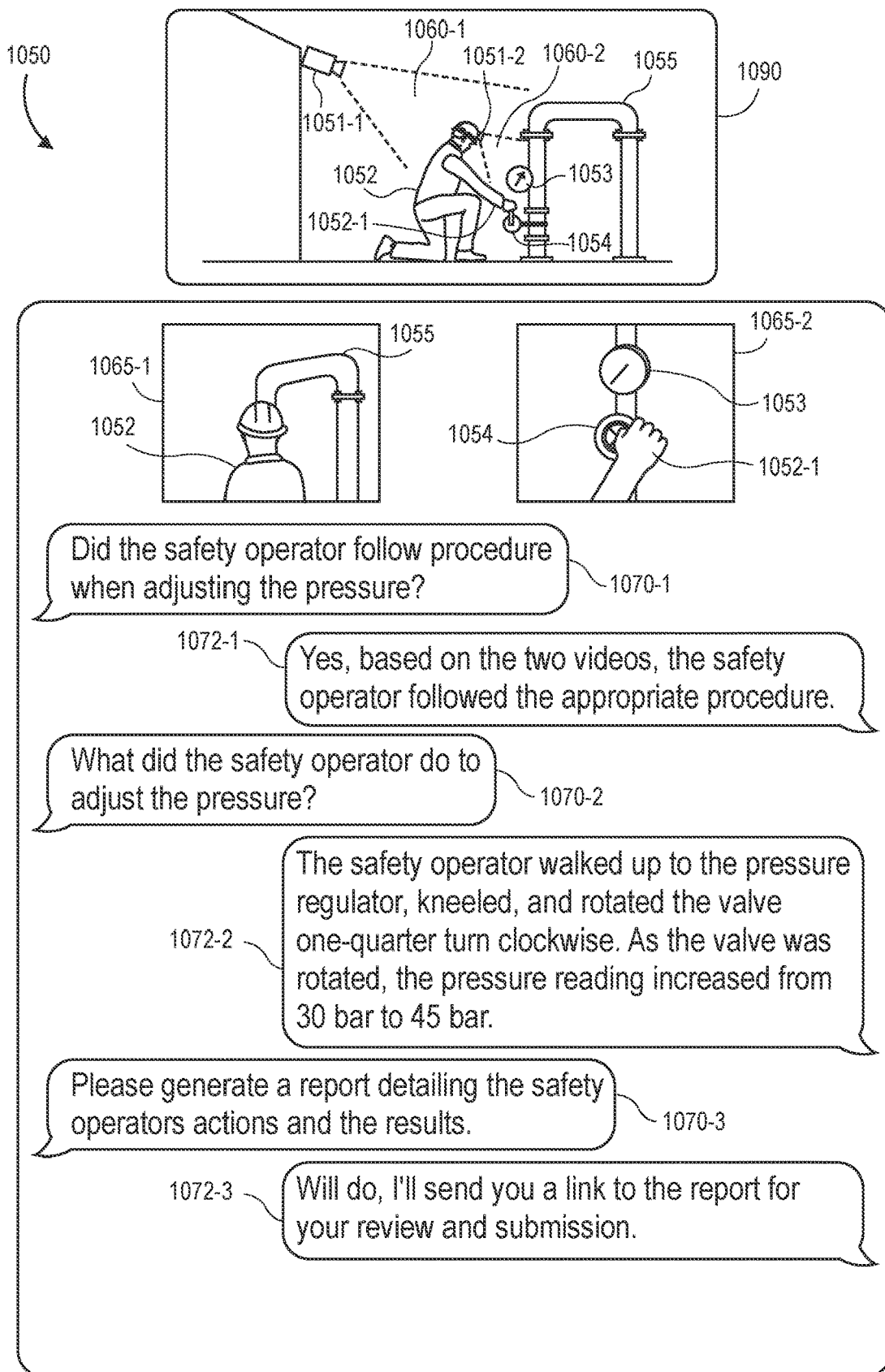
FIG. 10B is another illustration that processes video from two different cameras operating at an edge location to provide a question and answer session regarding the content of the videos, in accordance with disclosed implementations.

For example, FIG. 10B is another illustration 1050 that processes video from two different cameras operating at an edge location to provide a question and answer session regarding the content of the videos, in accordance with disclosed implementations.

For example, the illustration 1090, depicts a safety operator working on a pressure valve in which a first camera 1051-1 having a first field of view 1060-1 is generating a first video 1065-1 and a second camera 1051-2, which is mounted on the helmet worn by the operator 1052 and having a second field of view 1060-2 is generating a second video 1065-2. As illustrated in the first video 1052, the first field of view 1060-1 of the first camera 1051-1 is partially obstructed by the operator 1052 such that the pressure valve 1054 and the pressure gauge 1053 are occluded and not visible in the first video 1065-1, but the operator 1052 is partially visible. In comparison, the second field of view 1060-2 of the second camera is not occluded and includes the pressure valve 1054 and the pressure gauge 1053, along with the hand 1052-1 of the operator.

In this example, the user may submit a query as part of the Q&A session, such as a first query 1070-1 of "Did the safety operator follow procedure when adjusting the pressure?" In responding to the query, the disclosed implementations may determine segments of the first video 1065-1 and segments of the second video 1065-2 that are responsive to the query and that are provided, along with context of the Q&A session, the user, the query, the edge location, etc., to the conversational model. For example, the segments of the first video 1065-1 that illustrate the safety operator 1052 approaching the pressure valve 1054, kneeling, etc., may be determined to be responsive to the first query 1070-1. Likewise, segments of the second video 1065-2 illustrating the hand 1052-1 rotating the pressure value 1054 may also be determined to be responsive to the query.

In the illustrated example, the segments of the first video 1065-1 determined to be responsive to the query, the segments of the second video 1065-2 determined to be responsive to the query, and the context may all be considered when responding to the first query 1070-1. The disclosed implementations, using the above described techniques may process the segments and context determined to be relevant and generate a first natural language response 1072-1 of "Yes, based on the two videos, the safety operator followed the appropriate procedure."

The user may submit any number of additional queries as part of the Q&A session. For example, the user may submit a second query 1070-2 of "What did the safety operator do to adjust the pressure?" As discussed above, the videos, such as the first video 1065-1 and the second video 1065-2, or the embeddings/descriptive text determined for segments of those videos, along with context, may be utilized in accordance with the disclosed implementations to generate a response to the query, such as a second response 1072-2 of "The safety operator walked up to the pressure regulator, kneeled, and rotated the value one-quarter turn clockwise. As the valve was rotated, the pressure reading increased from 30 bar to 45 bar."

In the example second response 1072-2, the disclosed implementations combined information determined from both the first video 1065-1 and the second video 1065-2, and optionally information from a pressure sensor that, in addition to the pressure gauge, provides pressure data. For example, segments of the first video were utilized to generate the portion of the second response of "The safety operator walked to the pressure regulator, kneeled," as this information is not determinable from the second video 1065-2. In comparison, segments from the second video are utilized to generate the portion of the second response of "and rotated the valve one-quarter turn clockwise. As the valve was rotated, the pressure reading increased from 30 bar to 45 bar." as that information is not visible or determinable from the first video 1065-1. Likewise, in some implementations, the pressure readings may be determined from the second video 1065-2, which include a representation of the pressure gauge 1053 and/or from data from a pressure sensor.

In some implementations, as part of the Q&A session, the user may request that other actions be performed on behalf of the user. For example, and as illustrated in FIG. 10B, the user may submit a request 1070-3 of "Please generate a report detailing the safety operators actions and the results." The disclosed implementations may process the third request 1070-3 and determine that a report is to be generated and provided to the user. In such an example, the response 1072-3 that is presented as part of the query may be responsive to the request, such as, the third response of "Will do, I'll send you a link to the report for your review and submission." In addition, the disclosed implementations may utilize the request as an instruction to generate a report that describes the actions taken by the safety operator. Such actions can be generated from the text-based video narrative generated and stored for the video, as discussed above.

Figure 10C:
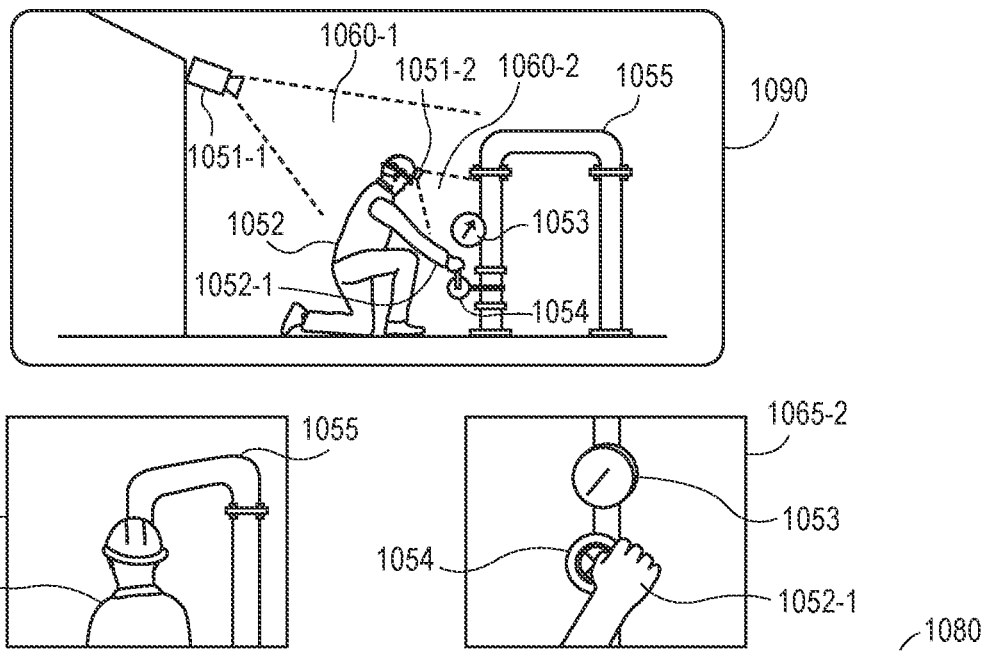
FIG. 10C is an illustration of an inspection report that may be automatically generated, in accordance with the disclosed implementations.

FIG. 10C is an illustration of an inspection report 1080 that may be automatically generated, in accordance with the disclosed implementations. As illustrated, the report may be generated for a report template that includes a plurality of segments and corresponding response sections that may be automatically populated based on information determined for a processing of the video data in accordance with the disclosed implementations. In some implementations, it may be automatically determined that a report is to be generated. In other implementations, a user may submit a request or query asking that a report be generated.

In the illustrated example, as the videos 1065-1 and 1065-2 are generated while the safety inspector is performing the safety inspection, information determined from the videos may be automatically utilized to complete one or more reports, such as an inspection report 1080. For example, the disclosed implementations may process video data, as discussed above, to generate and include in the report 1080 responses 1082-1, 1082-2, 1082-3, 1082-4, 1082-5, 1082-6, through 1082-N for the defined segments 1081-1, 1081-2, 1081-3, 1081-4, 1081-5, 1081-6, through 1081-N of the report 1080. For example, defined activities may be determined for each segment and when the activity is detected, the response may be determined and automatically populated into the report 1080. In the illustrated example, during processing of the videos 1065-1, 1065-2, the response 1082-1 of "30 bar" has been determined from the processing of the video and automatically populated into the report as responsive to the segment "pressure initial" 1081-1. Likewise, after the safety inspector adjusted the valve, the result of "45 bar" 1082-2 is determined from a processing of the video 1065-2 and automatically populated into the report 1080 as responsive to the segment "pressure adjusted/final" 1081-2. Still further, the responses 1082-3 of "20 C" and 1082-4 of "YES" are determined and automatically populated into the report 1080 for segments "temperature" 1081-3 and "within range" 1081-4.

As illustrated, because the safety inspector has not completed the inspection, responses 1082-5, 1082-6, through 1082-N have not yet been automatically populated into the report because the safety inspector has not yet performed those actions or made those determinations. As the safety inspector continues and performs the necessary tasks, the video data 1065-1/1065-2 will be processed and responses automatically populated into the report 1080.

As will be appreciated, any number and/or type of segments may be included in report and any defined responses may also be included and those discussed herein are provided only as examples. Likewise, any type of reports may be defined and automatically populated in accordance with the disclosed implementations. Other example reports may include, but are not limited to, police reports, drill rig reports, safety reports, incident reports, etc.

Figure 11:
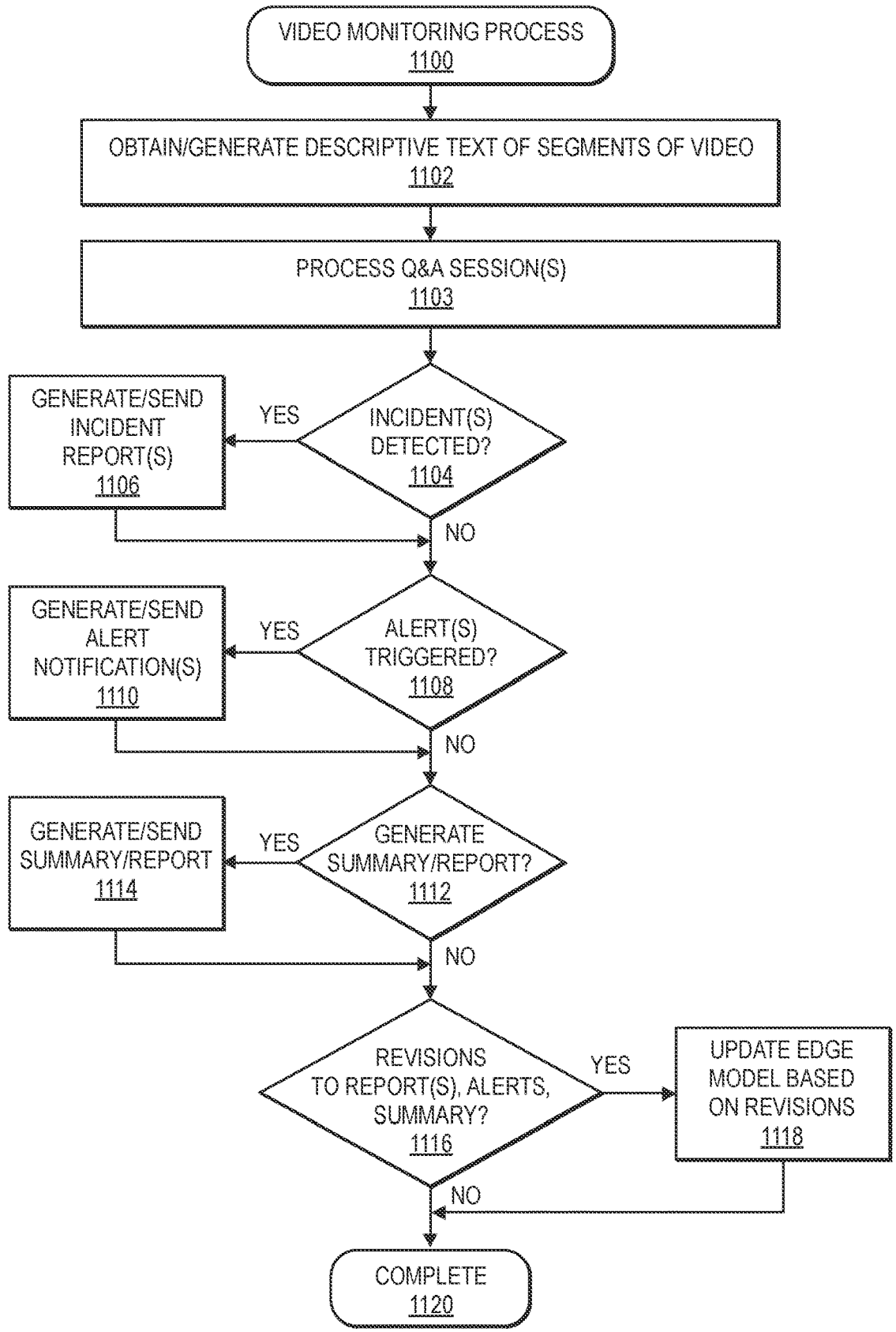
FIG. 11 is an example video monitoring process, in accordance with disclosed implementations.

FIG. 11 is an example video monitoring process 1100, in accordance with disclosed implementations. The example process 1100 may run continuously or periodically to determine what action, if any, needs to be performed with respect to a video. Additionally, while the example process illustrates actions being performed in series, it will be appreciated that one or more aspects of the example process 1100 may be performed in parallel.

The example process 1100 begins by obtaining/generating descriptive text of segments of a video, as in 1102. Generation of descriptive text of segments of a video is discussed above. The example process 1100 may also process the substance of one or more Q&A sessions corresponding to the segments and/or the video(s) as in 1103. For example, the queries or requests and/or the responses, such as those discussed above, may be processed to determine if a request for a report, alert, etc., is to be performed.

As descriptive text is generated for segments of a view and/or obtained from storage, along with processing of the Q&A sessions, the example process 1100 may determine if an incident has been detected, as in 1104. For example, one or more incidents may be defined as an activity that is detected and included in an activity embedding when the segment of video is processed in accordance with the disclosed implementations. For example, an incident could be a water break in a pipe that can be detected in segments of video as an activity and included in an activity embedding. As another example, an incident could be a collision between two or more moving objects (e.g., vehicles) that can be detected in segments of a video as an activity and included in an activity embedding. As will be appreciated, any number of incidents can be defined for an edge location, detected as activities, and detected by the example process 1100.

If it is determined that an incident is detected, a corresponding incident report may be generated and optionally sent, for example to an operator, safety response team, supervisor, manager, etc., as in 1106. In some examples, incident report templates or shells may be pre-generated for one or more incidents that include defined sections that are to be completed upon detection of an incident. For example, a water pipe break may include a pre-defined template with sections for temperature, pressure, time of break, flow rate of water from the break, etc. Upon detection of the incident, the video may be further processed to determine responses to each of the defined sections and the incident automatically populated and completed.

If it is determined that an incident was not detected and/or after generating an incident report, it may be determined whether one or more alerts are to be triggered based on the processed segments of the video data, as in 1108. Any number of alerts may be generated and considered as part of the example process 1100. Likewise, the alerts may be specific to the edge location, specific to the video or the subject matter of the video, etc. In some examples, the alert may have a threshold value (e.g., pressure range, temperature, etc.) and when processing of the segments of the video determines that the threshold has been satisfied, the alert may be triggered. As another example, one or more alerts may be binary, either detected or not detected. In such an example, if the monitored for features (e.g., temperature, presence or absence of a person, etc.) are detected the alert is determined satisfied.

Returning to FIG. 11, if it is determined that an alert is triggered, an alert notification is generated and sent, such as to a user, manager, operator, inspector, etc., as in 1110. If it is determined that an alert has not been triggered or after generating and sending an alert notification, a determination may be made as to whether a summary and/or a report are to be generated, as in 1112. If it is determined that a summary or report is to be generated the example process 1100 causes the summary or report to be generated, as in 1114. In some implementations, a summary may be generated for every video. In another example, a report or summary may be generated any time an alert is triggered, or an incident is detected. Similar to an incident report, any of a variety of reports may be predefined and populated based on the descriptive text and the context of the video as determined herein. In comparison, a summary may be an overall distillation or overview of the video based on the text-based video narrative generated for the video.

After generating the summary or report, or if it is determined at decision block 1112 that a summary or report is not to be generated, the example process 1100 may monitor and determine whether any modification or revisions have been made to any of the generated reports, alerts, and/or summaries, as in 1116. For example, a recipient of a report, summary, alert, etc., may modify or update the generated report, summary, alert, etc., and those modifications/updates may be received by the example process 1100. If it is determined that a modification/update has been made, the edge model that is performing the disclosed implementations may receive the modification/update and further refine itself to improve operation of the model based on the specifics of the edge location, as in 1118. After updating or refining the edge model, or if it is determined at decision block 1116 that no modifications/changes have been made, the example process 1100 completes, as in 1120.

Although some embodiments of the present disclosure show the use of edge computing units in support of operations in one or more industrial applications or functions, those of ordinary skill in the pertinent arts will realize that the systems and methods of the present disclosure are not so limited. Rather, the systems and methods of the present disclosure may be utilized in connection with any operations, and in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures may indicate the same or similar items or features.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, a storage medium can be integral to a processor, and can be volatile or non-volatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X. Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method, comprising:
   processing a segment of a video to generate a plurality of embedding vectors, each embedding vector of the plurality of embedding vectors corresponding to at least a portion of a subject matter represented in the segment of the video;
   aggregating the plurality of embedding vectors to generate a feature embedding for the segment;
   determining, based at least in part on a distance in a vector space between the feature embedding and a prior feature embedding generated for a prior segment of the video, that the segment is different than the prior segment;
   in response to determining that the segment is different than the prior segment, generating, based at least in part on the feature embedding, a descriptive text indicative of the feature embedding;
   generating, based at least in part on the descriptive text, a natural language description of the subject matter represented in the segment; and
   presenting the natural language description.

2. The computer-implemented method of claim 1, wherein processing the segment further includes:
   processing the segment with a local semantic attention transformer to generate a plurality of local embedding vectors, wherein the plurality of local embedding vectors are included in the plurality of embedding vectors;
   processing the segment with a global semantic attention transformer to generate a plurality of global embedding vectors, wherein the plurality of global embedding vectors are included in the plurality of embedding vectors;
   processing the segment with a temporal semantic attention transformer to generate a plurality of temporal embedding vectors, wherein the plurality of temporal embedding vectors are included in the plurality of embedding vectors; and
   processing the segment with an activity semantic attention transformer to generate a plurality of activity embedding vectors, wherein the plurality of activity embedding vectors are included in the plurality of embedding vectors.

3. The computer-implemented method of claim 2, wherein:
   the local semantic attention transformer is configured to generate a local embedding vector for each of a plurality of objects represented in the segment; and
   the global semantic attention transformer is configured to generate a global embedding vector for each dependency between two or more objects represented in the segment.

4. The computer-implemented method of claim 2, further comprising:
   training the activity semantic attention transformer to detect a plurality of defined activities and generate, for each detected activity, an activity embedding vector indicative of the detected activity.

5. The computer-implemented method of claim 2, wherein a temporal embedding vector of the plurality of temporal embedding vectors is indicative of a dependency of at least one feature of the segment over a duration of the segment.

6. The computer-implemented method of claim 1, further comprising:
   processing a second segment of the plurality of segments of the video to generate a second feature embedding;
   determining that a second distance in the vector space between the feature embedding and the second feature embedding is within a defined distance; and
   in response to determination that the second feature embedding is within the defined distance of the feature embedding, discard the second segment.

7. A computing system, comprising:
   one or more processors; and
   a memory storing program instructions that, when executed by the one or more processors, cause the one or more processors to at least:
   process a segment of a plurality of segments of a video to generate a plurality of embedding vectors, each embedding vector of the plurality of embedding vectors corresponding to at least a portion of a subject matter represented in the segment;
   aggregate the plurality of embedding vectors to generate a feature embedding for the segment that includes each of the embedding vectors;
   determine, based at least in part on a distance in a vector space between the feature embedding and a prior feature embedding generated for a prior segment of the video, that the segment is different than the prior segment;
   in response to determination that the segment is different than the prior segment, process the feature embedding to generate a descriptive text indicative of the feature embedding and the subject matter;
   process the descriptive text to generate a text-based video narrative of the segment that describes the subject matter of the segment in a natural language; and
   present the text-based video narrative.

8. The computing system of claim 7, wherein the program instructions that, when executed by the one or more processors, further cause the one or more processors to at least:
   compare the descriptive text with a prior descriptive text that was generated for a prior segment of the video that occurred prior in time to the segment of the video;
   determine, based at least in part on the comparison, that the descriptive text corresponds to the prior descriptive text; and
   in response to determination that the descriptive text corresponds to the prior descriptive text:
   discard the segment from memory; and
   associate the descriptive text with the prior segment.

9. The computing system of claim 7, wherein the program instructions that, when executed by the one or more processors, further cause the one or more processors to at least:
process a second segment of the plurality of segments of the video to generate a second feature embedding;
determine that a second distance in the vector space between the feature embedding and the second feature embedding is within a defined distance; and
in response to determination that the second feature embedding is within the defined distance of the feature embedding, discard the second segment.

10. The computing system of claim 7:
wherein the program instructions that, when executed by the one or more processors, further cause the one or more processors to at least determine an activity of a plurality of activities that is occurring in the subject matter of the segment; and
wherein the program instructions that cause the one or more processors to process the descriptive text further include program instructions that, when executed by the one or more processors, further cause the one or more processors to at least process the descriptive text and the determined activity to generate the text-based video narrative that describes, at least in part, the activity.

11. The computing system of claim 7, wherein the program instructions that cause the one or more processors to present the text-based video narrative further include program instructions that, when executed by the one or more processors, further cause the one or more processors to at least:
present the text-based video narrative at least one of audibly, visually, or haptically.

12. The computing system of claim 7, wherein the program instructions that cause the one or more processors to generate the text-based video narrative, further include program instructions that, when executed by the one or more processors, further cause the one or more processors to at least:
process the descriptive text and a context determined based at least in part on one or more of a prior segment of the video that occurs at a prior point in time than the segment, the subject matter of the video, a user, or a prior text-based narrative determined for the prior segment, to generate the text-based video narrative of the segment.

13. The computing system of claim 7, wherein the program instructions that, when executed by the one or more processors, further cause the one or more processors to at least:
segment the video into the plurality of segments, wherein the segment is included in the plurality of segments.

14. The computing system of claim 13, wherein a prior segment of the plurality of segments at least partially overlaps the segment.

15. The computing system of claim 7, wherein the program instructions that cause the one or more processors to process the segment, further include program instructions that, when executed by the one or more processors, further cause the one or more processors to at least:
process the segment with a temporal semantic attention transformer to generate a plurality of temporal embedding vectors, wherein the plurality of temporal embedding vectors are included in the feature embedding; and
process the segment with an activity semantic attention transformer to generate a plurality of activity embedding vectors, wherein the plurality of activity embedding vectors are included in the feature embedding vector.

16. The computing system of claim 15, wherein the program instructions that, when executed by the one or more processors, further cause the one or more processors to at least:
train the activity semantic attention transformer to detect a plurality of defined activities and generate, for each detected activity, an activity embedding vector indicative of the detected activity.

17. A method, comprising:
processing a segment of a plurality of segments of a video to generate a plurality of embedding vectors, each embedding vector of the plurality of embedding vectors corresponding to at least a portion of an activity occurring in a subject matter of the segment;
aggregating the plurality of embedding vectors to generate a feature embedding for the segment that includes each of the embedding vectors;
determining, based at least in part on a distance in a vector space between the feature embedding and a prior feature embedding generated for a prior segment of the video, that the segment is different than the prior segment;
in response to determining that the segment is different than the prior segment, generating, based at least in part on the feature embedding, a text-based video narrative that is descriptive of the activity and the subject matter represented in the segment; and
causing at least one of a presentation or a storage of the text-based video narrative.

18. The method of claim 17, wherein processing the segment further includes:
processing the segment with an activity semantic attention transformer that is trained to detect a presence or an absence of the activity.

19. The method of claim 17:
further comprising, processing the segment with a visual attention transformer that converts that segment into at least one of the plurality of embedding vectors; and
wherein:
generating further includes, processing, with a video-to-text transformer, the plurality of embedding vectors to generate the text-based video narrative.

20. The method of claim 17, further comprising:
determining, based at least in part on the text-based video narrative, that the segment is duplicative of at least one other segment of the video; and
in response to determining that the segment is duplicative of at least one other segment of the video, discarding at least one of the segment or the at least one other segment.

* * * * *